(12) United States Patent
Watano et al.

(10) Patent No.: US 12,454,211 B2
(45) Date of Patent: Oct. 28, 2025

(54) VEHICLE LAMP, AND CONTROL DEVICE AND CONTROL METHOD FOR SAME

(71) Applicant: KOITO MANUFACTURING CO., LTD., Tokyo (JP)

(72) Inventors: Yuichi Watano, Shizuoka (JP); Yuta Maruyama, Shizuoka (JP); Yoshihiro Katsurada, Shizuoka (JP); Takuya Kataoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 154 days.

(21) Appl. No.: 18/031,947

(22) PCT Filed: Oct. 13, 2021

(86) PCT No.: PCT/JP2021/037937
§ 371 (c)(1),
(2) Date: Apr. 14, 2023

(87) PCT Pub. No.: WO2022/080425
PCT Pub. Date: Apr. 21, 2022

(65) Prior Publication Data
US 2023/0382289 A1 Nov. 30, 2023

(30) Foreign Application Priority Data

Oct. 15, 2020 (JP) .................. 2020-173635
Oct. 27, 2020 (JP) .................. 2020-179293
Oct. 27, 2020 (JP) .................. 2020-179294

(51) Int. Cl.
B60Q 1/00 (2006.01)
B60Q 1/08 (2006.01)
(Continued)

(52) U.S. Cl.
CPC ............. *B60Q 1/0023* (2013.01); *B60Q 1/08* (2013.01); *B60Q 1/143* (2013.01); *B60Q 1/34* (2013.01);
(Continued)

(58) Field of Classification Search
CPC ........ B60Q 1/0023; B60Q 1/143; B60Q 1/08; B60Q 1/34; B60R 11/04
See application file for complete search history.

(56) References Cited

U.S. PATENT DOCUMENTS

2008/0084165 A1* 4/2008 Otsuka .................. H04N 7/183
315/82
2016/0185276 A1* 6/2016 Tanaka ................. F21S 41/657
362/466
(Continued)

FOREIGN PATENT DOCUMENTS

CN 106218533 A 12/2016
JP 2001-001832 A 1/2001
(Continued)

OTHER PUBLICATIONS

International Search Report in corresponding International Application No. PCT/JP2021/037937, dated Dec. 12, 2021 (11 pages).
(Continued)

Primary Examiner — William J Carter
(74) Attorney, Agent, or Firm — Osha Bergman Watanabe & Burton LLP

(57) ABSTRACT

Provided is a lamp mounted on a vehicle where a lamp housing of the lamp is equipped with a lamp camera that captures an image of an object existing outside the vehicle and a lamp unit of which light distribution of emitted light beams is controlled to change based on positional information of the object captured by the lamp camera, in which the lamp camera has an imaging optical axis directed in a (Continued)

predetermined direction with respect to the vehicle, and the lamp unit is configured such that an illumination optical axis is controlled to change in an up-down direction based on the positional information of the object.

14 Claims, 15 Drawing Sheets

(51) Int. Cl.
| | |
|---|---|
| *B60Q 1/14* | (2006.01) |
| *B60Q 1/34* | (2006.01) |
| *F21S 41/657* | (2018.01) |
| *F21S 45/70* | (2018.01) |
| *F21W 102/155* | (2018.01) |
| *F21W 102/165* | (2018.01) |
| *F21Y 115/10* | (2016.01) |

(52) U.S. Cl.
CPC ............ *F21S 41/657* (2018.01); *F21S 45/70* (2018.01); *B60R 2300/404* (2013.01); *F21W 2102/155* (2018.01); *F21W 2102/165* (2018.01); *F21Y 2115/10* (2016.08)

(56) References Cited

U.S. PATENT DOCUMENTS

| | | |
|---|---|---|
| 2020/0164791 A1 | 5/2020 | Baek et al. |
| 2020/0324687 A1 | 10/2020 | Yamamura et al. |
| 2021/0031675 A1 | 2/2021 | Shibata et al. |
| 2021/0231284 A1 | 7/2021 | Mano et al. |
| 2021/0370820 A1 | 12/2021 | Shibata et al. |

FOREIGN PATENT DOCUMENTS

| | | |
|---|---|---|
| JP | 2005-178576 A | 7/2005 |
| JP | 2013-243000 A | 12/2013 |
| JP | 2019-167011 A | 10/2019 |
| JP | 2019-194940 A | 11/2019 |
| JP | 2020-029196 A | 2/2020 |
| KR | 2020-0062534 A | 6/2020 |
| WO | 2018-135356 A1 | 7/2018 |
| WO | 2019-131055 A1 | 7/2019 |

OTHER PUBLICATIONS

Written Opinon in corresponding International Application No. PCT/JP2021/037937, dated Dec. 12, 2021 (8 pages).

\* cited by examiner

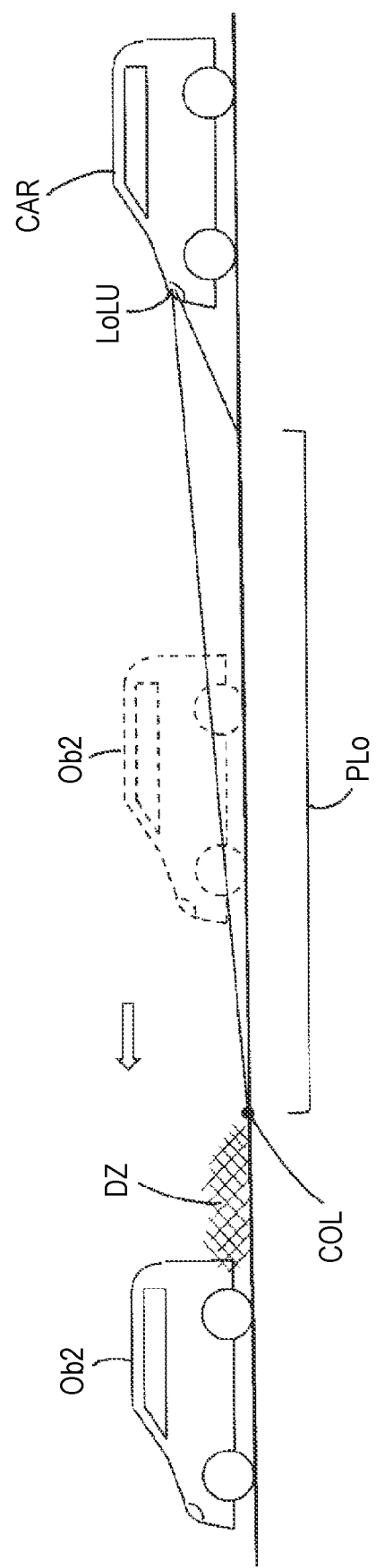

VEHICLE LAMP, AND CONTROL DEVICE AND CONTROL METHOD FOR SAME

TECHNICAL FIELD

The present invention relates to a vehicle lamp applied to a headlamp of a vehicle such as an automobile, and a control device and control method for controlling light distribution thereof.

BACKGROUND ART

In recent years, an automobile headlamp has adopted adaptive driving beam (ADB: variable light distribution) control that enhances a lighting effect in front of the automobile while preventing dazzling of a preceding vehicle, an oncoming vehicle, and a pedestrian (hereinafter referred to as an object). In Patent Literature 1, when an object is detected from an image captured by a camera, ADB control is performed to detect a position of the object and control an irradiation area of an illumination light beam of a lamp unit based on the detected position.

In a headlamp that performs such ADB control, when a deviation between a direction of an optical axis when the object is viewed from the lamp and a direction of an optical axis when the object is imaged by a camera, that is, a parallax occurs, an error occurs in light distribution control of the lamp unit based on the image captured by the camera. Therefore, in Patent Literature 1, the lamp unit and the camera are built in the same lamp housing.

Also, this type of headlamp is provided with an aiming adjustment mechanism for adjusting an optical axis direction of a lamp unit. As this aiming adjustment mechanism, the lamp unit is usually mounted on a tiltable bracket, and the optical axis direction of the lamp unit is adjusted by adjusting a forward tilting angle of the bracket. Further, in the headlamp that performs ADB control, a camera is mounted on the same bracket together with the lamp unit, and the optical axis of the lamp unit is adjusted while an optical axis direction of the camera is aligned with the optical axis direction of the lamp unit.

Also, in a headlamp that performs ADB control, there is a case where a camera for imaging an object is disposed close to a lamp unit. For example, Patent Literature 2 proposes a headlamp in which a lamp unit and a camera are installed in a lamp housing. By installing such a camera (hereinafter referred to as a lamp camera) in the lamp housing, it is possible to set an illumination optical axis for irradiating a light beam from the lamp unit and an imaging optical axis of the lamp camera at almost the same height. As a result, viewing angles of the respective optical axes with respect to the object can be made substantially the same, and thus there is an advantage in that the ADB control can be facilitated.

Further, as one form of ADB control, a configuration has been proposed in which a low beam light distribution pattern (hereinafter, Lo light distribution pattern) having a required cutoff line and an ADB high beam light distribution pattern (hereinafter, AHi light distribution pattern) for additionally illuminating an area above the Lo light distribution pattern are combined to perform light distribution. In this form, by selectively shading part of the AHi light distribution pattern, that is, an area containing the object, ADB control that can illuminate as wide an area as possible while preventing dazzling of the object can be realized.

CITATION LIST

Patent Literature

Patent Literature 1: WO2018/135356A
Patent Literature 2: JP2019-194940A

SUMMARY OF INVENTION

Technical Problem

In this headlamp, when ADB control is performed, in some cases, control is performed to vertically deflect an entire light irradiation area without changing a light distribution pattern. In this case, control for vertically deflecting an optical axis direction of a lamp unit, that is, so-called leveling control is performed. That is, a bracket on which the lamp unit is mounted is configured to be tiltable by a leveling actuator, and when required by the ADB control, the leveling actuator is driven to tilt the bracket so that the optical axis direction of the lamp unit is vertically tilted. This makes it possible to simplify processing in the ADB control.

However, when the bracket is tilted to change the optical axis direction of the lamp unit in leveling control, an optical axis direction of a camera mounted on the bracket is also changed accordingly. Therefore, a position in an image captured by the camera is changed, and it becomes necessary to correct a positional change of an object when detecting the object. The leveling control is required to follow the positional change of the object and to be performed at high speed. However, when a position of the object in the captured image is shifted, processing for correcting this position is required, and thus the processing takes time, thereby making it difficult to perform leveling control or ADB control with high speed and good followability.

Also, when the lamp unit and the lamp camera are disposed close to each other, part of light beams emitted by the lamp unit may leak into an imaging area of the lamp camera. In particular, since the lamp camera and the lamp unit are provided in one lamp housing, this kind of light leakage is likely to occur. When such light leakage occurs, an image captured by the lamp camera becomes blurred due to so-called whiteout, and detection performance of the object deteriorates. In Patent Literature 2, a light shielding structure such as a lens hood is attached to a camera installed in a lamp housing, or a part of the lamp housing is provided with a light shielding structure that prevents light beams from leaking into the lamp camera.

However, it is difficult to completely prevent light leakage with these light shielding structures. In particular, lamp units that emit light beams toward a wide range, such as sign lamps, for example, headlamps with built-in turn signal lamp units, are configured to emit light beams toward a wide area on left and right of an automobile compared to high beam lamp units and low beam lamp units, so it is easy for light beams to leak into the lamp camera. When such light leakage occurs, it becomes difficult to detect an object using the lamp camera when the turn signal lamp is turned on, and thus it becomes difficult to perform suitable light distribution control of the headlamp.

In the ADB control, in order to enhance an effect of preventing dazzling an object, light distribution control is performed such that a predetermined margin is provided for an area including the object, and an area somewhat wider than the object is shaded. Therefore, when a position of the object with respect to an own vehicle changes, especially when the position changes at a higher speed than a control speed of ADB control, a dark area (hereinafter referred to as a dark zone) where light beams are not emitted may occur in a partial area around the object.

For example, although a specific example will be described below, when performing ADB control that combines a Lo light distribution pattern and an AHi light distribution pattern, when an inter-vehicle distance between an own vehicle and a preceding vehicle increases, the preceding vehicle is moved to an area above (farther) than a cutoff line of the Lo light distribution pattern. Therefore, an area between a light shaded area of the AHi light distribution pattern and an area above the cutoff line of the Lo light distribution pattern becomes a dark zone. When such a dark zone occurs, it is not possible to suitably illuminate an area in front of the own vehicle, including a part of the preceding vehicle and an area immediately behind the preceding vehicle, which is not preferable for safe driving of the own vehicle.

A first object of the present invention is to provide a vehicle lamp that can perform high-speed leveling control or ADB control and a control device for controlling light distribution thereof. A second object of the present invention is to provide a vehicle lamp control device that suppresses influence of light leakage in a lamp camera in a vehicle lamp with a lamp camera and a lamp unit, and enables, for example, detection of an object in light distribution control with high accuracy. A third object of the present invention is to provide a vehicle lamp control method and a control device that enable suitable light distribution control that eliminates a dark zone.

Solution to Problem

To achieve the first object of the present invention, a vehicle lamp of the present invention is a lamp mounted on a vehicle where a lamp housing of the lamp is equipped with a lamp camera that captures an image of an object existing outside the vehicle and a lamp unit of which light distribution of emitted light beams is controlled to change based on positional information of the object captured by the lamp camera, in which the lamp camera has an imaging optical axis directed in a predetermined direction with respect to the vehicle, and the lamp unit is configured such that an illumination optical axis is controlled to change in an up-down direction based on the positional information of the object.

To achieve the first object of the present invention, a vehicle lamp control device of the present invention includes a vehicle lamp mounted on a vehicle where a lamp housing is equipped with a lamp camera that captures an image of an object existing outside the vehicle and a lamp unit of which light distribution of emitted light beams is controlled to change based on positional information of the object captured by the lamp camera, and a control unit that controls the light distribution and an illumination optical axis of the lamp unit. The control unit includes an object detection unit that detects an object from the image captured by the lamp camera, and a lamp control unit that controls the light distribution of the lamp unit based on the positional information of the detected object, and controls a change of the illumination optical axis in an up-down direction of the lamp unit based on a positional change of the object.

To achieve a second object of the present invention, a vehicle lamp control device of the present invention includes, in a vehicle lamp including a lamp unit and a lamp camera, a lamp control unit that controls lighting of the lamp unit, an object detection unit that detects an object based on an imaging signal captured by the lamp camera, and a camera control unit that controls an imaging operation of the lamp camera. Moreover, the camera control unit performs hindrance suppression control for suppressing hindrance in object detection by the object detection unit due to leakage of a light beam from the lamp unit to the lamp camera.

To achieve a third object of the present invention, a vehicle lamp control method for controlling a lamp unit of a vehicle lamp that is capable of detecting an object from an image captured by a camera and changing a light distribution pattern of emitted light beams and an illumination optical axis based on positional information of the detected object includes a dark zone detection step of detecting an object and detecting a dark zone generated when the lamp unit irradiates the detected object with a light beam, and a dark zone control step of eliminating the detected dark zone, in which the dark zone control step includes a light distribution pattern control step of controlling the light distribution pattern of the lamp unit, and an illumination optical axis control step of controlling the illumination optical axis of the lamp unit, the light distribution pattern control step and the illumination optical axis control step being selectively or jointly executed.

To achieve the third object of the present invention, a vehicle lamp control device of the present invention includes a vehicle lamp including a lamp unit that is capable of changing a light distribution pattern of emitted light beams and an illumination optical axis and a control unit that detects an object from an image captured by a camera and controls the lamp unit based on positional information of the detected object, in which the control unit includes an object detection unit that detects the object and detects a dark zone that occurs when the lamp unit irradiates the detected object with a light beam, and a lamp control unit for selectively or jointly controlling the light distribution pattern and the illumination optical axis of the lamp unit based on the detected dark zone.

Advantageous Effects of Invention

According to the present invention, it is possible to provide a vehicle lamp that enables high-speed leveling control or ADB control, and a control device that controls light distribution thereof. Further, according to the present invention, it is possible to provide a vehicle lamp control device that suppresses influence of light leakage in a lamp camera in a vehicle lamp including a lamp camera and a lamp unit and makes it possible to detect an object, for example, in light distribution control, with high accuracy. Further, according to the present invention, it is possible to provide a vehicle lamp control method and a control device that enable suitable light distribution control that eliminates a dark zone.

BRIEF DESCRIPTION OF DRAWINGS

FIG. 16 is a schematic diagram illustrating a dark zone.

DESCRIPTION OF EMBODIMENTS

Figure 1:
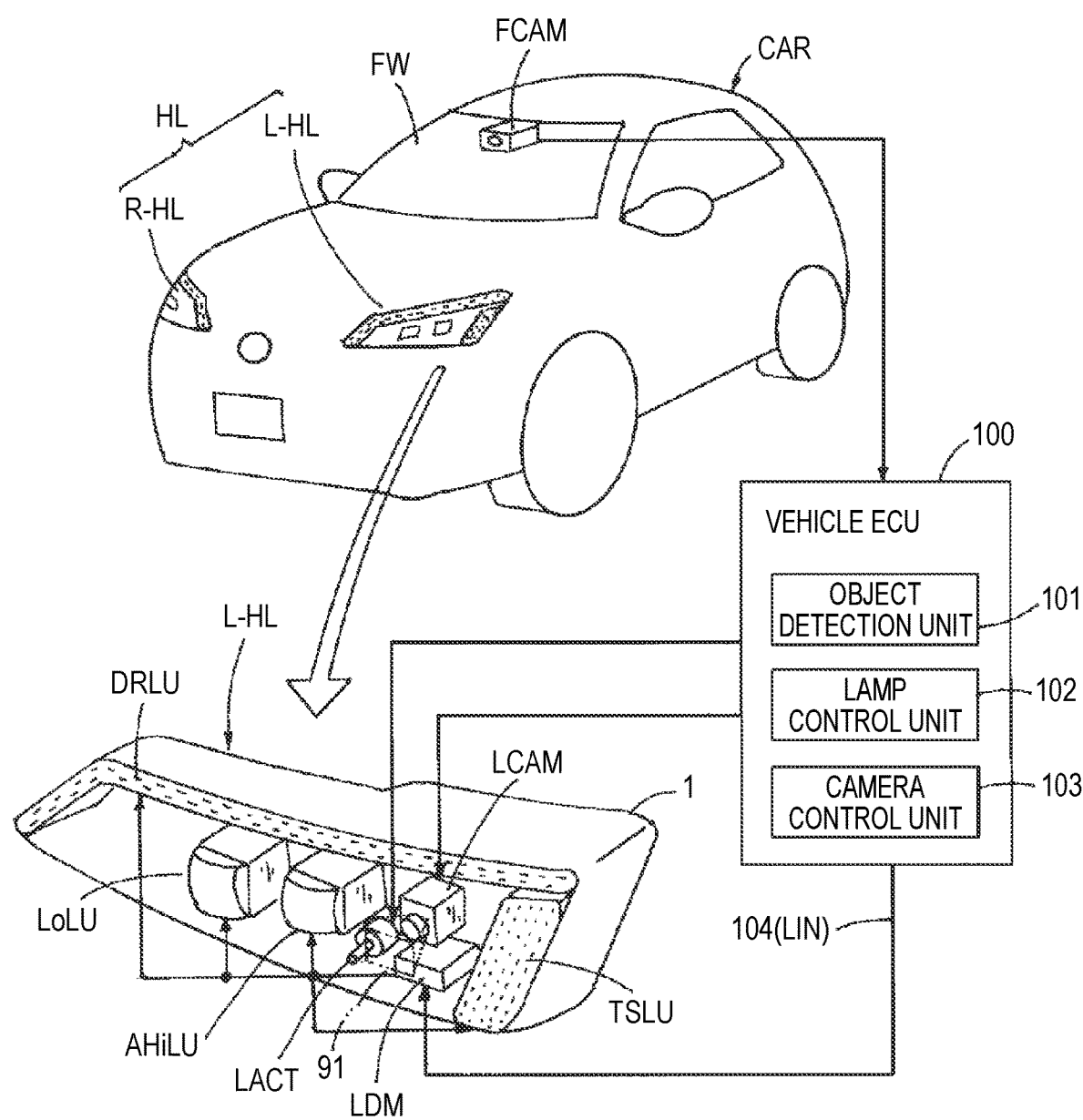
FIG. 1 is a conceptual configuration diagram of an embodiment of a vehicle lamp and a control device of the vehicle lamp.

Next, embodiments of the present invention will be described with reference to the drawings. FIG. 1 is a conceptual configuration diagram of an embodiment of a vehicle lamp and the control device of the vehicle lamp in which the present invention is applied to an automobile headlamp. In the figure, headlamps L-HL and R-HL are respectively provided on left and right sides of a front portion of a vehicle body of an automobile CAR. These left and right headlamps L-HL and R-HL are bilaterally symmetrical. In addition, hereinafter, the left and right headlamps may be collectively referred to as a headlamp HL.

In FIG. 1, a front camera FCAM is installed inside a front window FW of the automobile CAR, and it is possible to image a required area in front of the automobile CAR at a required frame rate and resolution. Here, the front camera FCAM includes an imaging lens with a predetermined focal length, and an imaging element of the imaging lens has light sensitivity ranging from a visible light region to an infrared light region. Therefore, the front camera FCAM can image an object with high resolution in the daytime or at nighttime.

The front camera FCAM is connected to a vehicle electronic control unit (ECU) 100 of an automobile. This vehicle ECU 100 is configured as control means in the present invention, and includes an object detection unit 101, a lamp control unit 102, and a camera control unit 103. The object detection unit 101 detects an object by image-analyzing an image captured by the front camera FCAM. It is also possible to detect the object by performing image-analysis on an image captured by a lamp camera LCAM, which will be described below.

The lamp control unit 102 generates a lamp control signal for controlling lighting and light distribution of the headlamp HL based on the detected object, and outputs the lamp control signal to the headlamp HL. Although the vehicle ECU 100 is provided with other control units for controlling vehicle speed and steering of the automobile CAR based on the object detected by the object detection unit 101, as well as for assisting driving, these control units have little relevance to the present invention, so description thereof will be omitted. A camera control unit 103 controls the front camera FCAM and the lamp camera LCAM described below.

As illustrated representatively by the left headlamp L-HL in FIG. 1, the headlamp HL includes a low beam lamp unit (hereinafter referred to as Lo lamp unit) LoLU, a high beam lamp unit (hereinafter referred to as AHi lamp unit) which can execute ADB control AHiLU, a turn signal lamp unit (hereinafter referred to as TS lamp unit) TSLU, and a daytime running lamp unit (hereinafter referred to as DR lamp unit) DRLU, which also serves as a clearance lamp. The headlamp HL is constructed as a composite headlamp in which these lamp units are incorporated in one lamp housing 1.

Further, the lamp housing 1 incorporates the lamp camera LCAM that performs imaging at a frame rate higher than that of the front camera FCAM, and thus it is possible to image an area in front of the automobile CAM, particularly an area substantially the same as the imaging area of the front camera FCAM. Further, the lamp housing 1 incorporates a lamp drive module LDM for driving light emission (lighting) of each lamp unit based on the lamp control signal. These lamp camera LCAM and the lamp drive module LDM are connected to the vehicle ECU 100.

Although detailed illustration is omitted, the TS lamp unit TSLU and the DR lamp unit DRLU are fixedly attached to the lamp housing 1. On the other hand, the Lo lamp unit LoLU, the AHi lamp unit AHiLU, and the lamp camera LCAM are mounted in the lamp housing 1 in such a manner that their respective optical axes, that is, directions of irradiation optical axes and imaging optical axes, can be appropriately adjusted.

Figure 2:
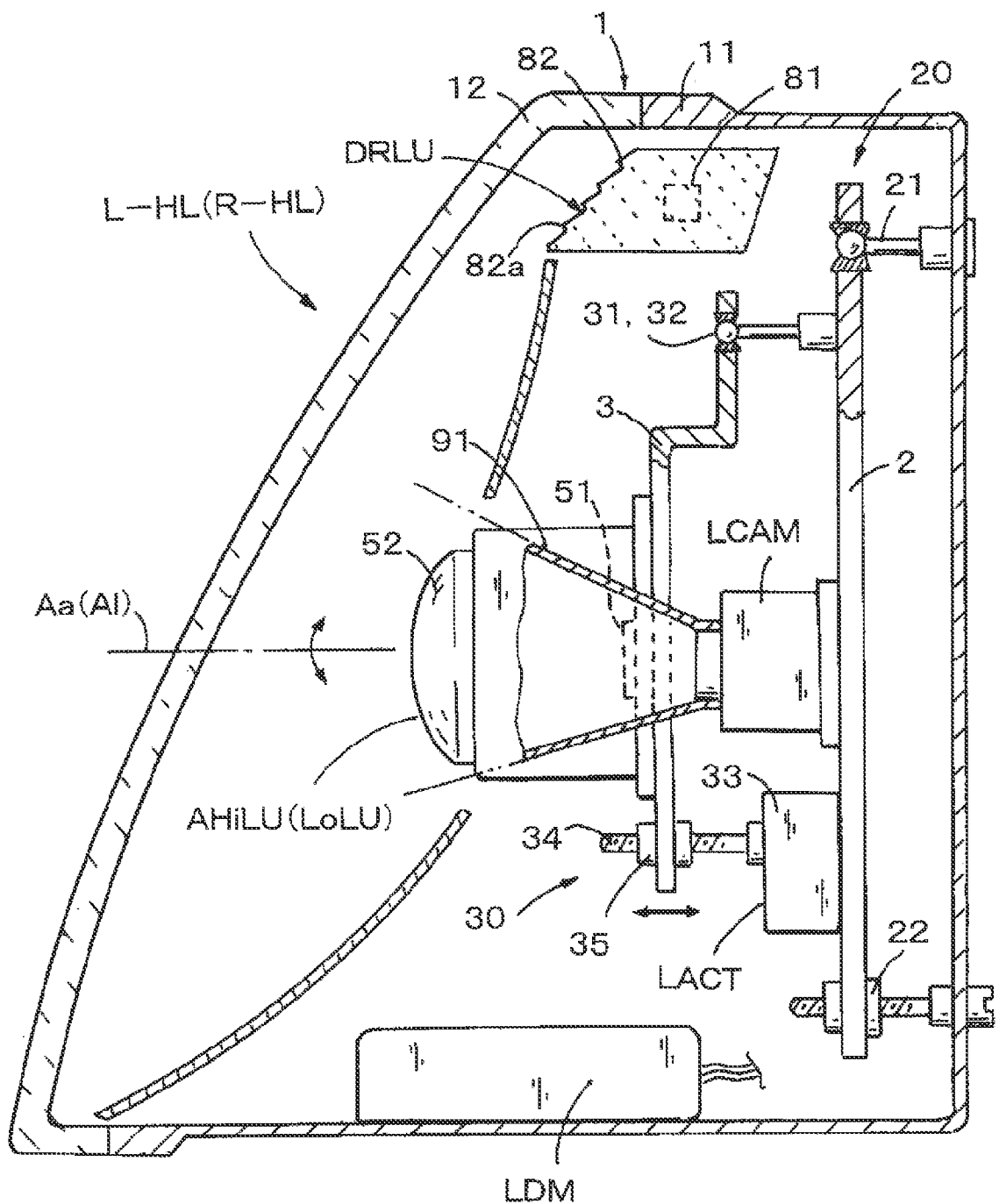
FIG. 2 is a longitudinal cross-sectional view of a left headlamp.
Figure 3:
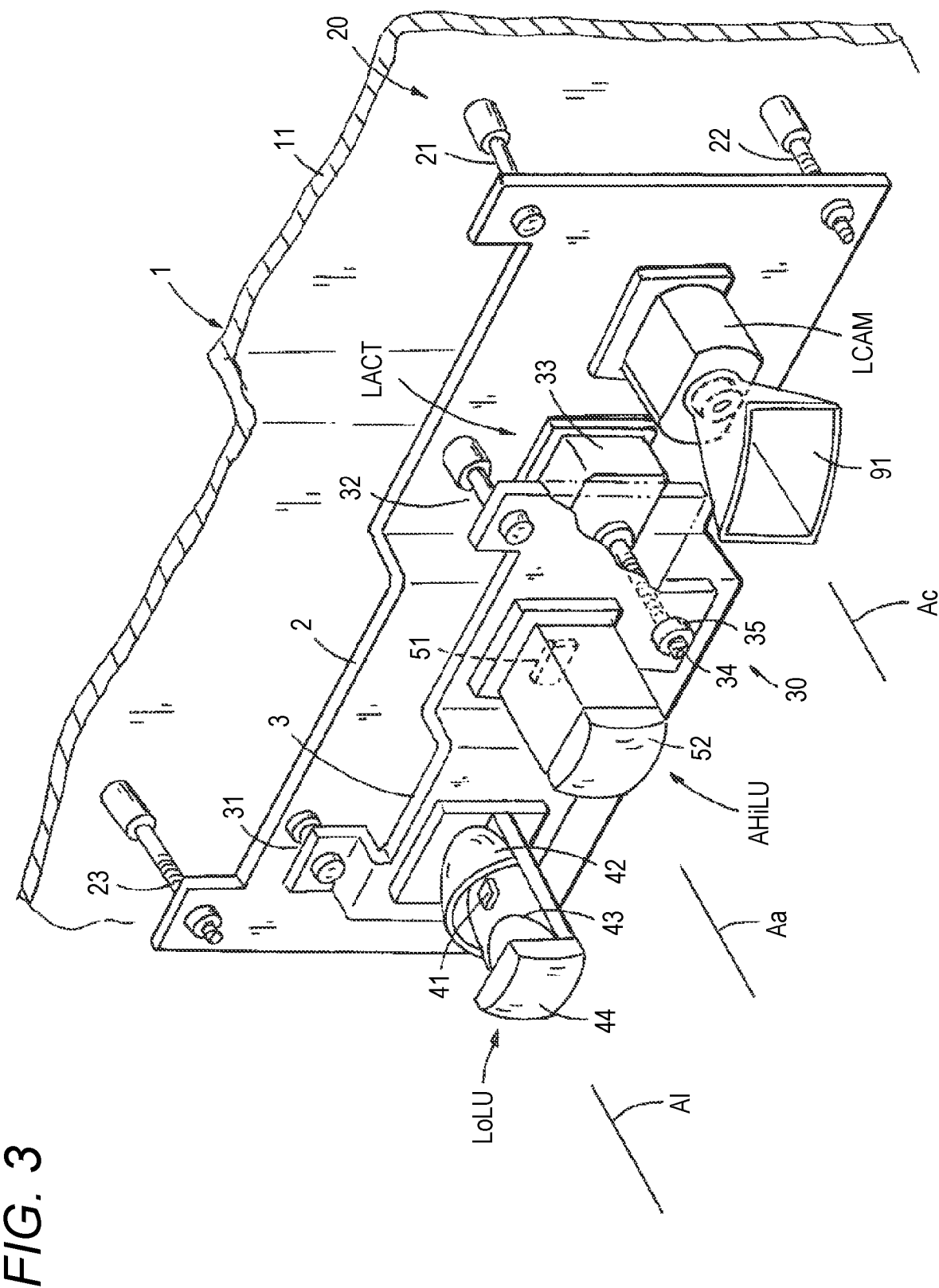
FIG. 3 is a schematic perspective view of a main configuration of the left headlamp.

FIGS. 2 and 3 are views illustrating configurations for adjusting the optical axis directions of the Lo lamp unit LoLU, the AHi lamp unit AHiLU, and the lamp camera LCAM. FIG. 2 is a longitudinal cross-sectional view of the left headlamp L-HL and FIG. 3 is a schematic perspective view thereof. In these figures, the lamp housing 1 is configured to include a lamp body 11 having a container shape with an open front and a translucent cover 12 attached to an opening of the lamp body 11. As described above, the TS lamp unit TSLU and the DR lamp unit DRLU are fixedly attached to the lamp body 11, and are configured to execute light irradiation through the translucent cover 12 when lit.

In the lamp housing 1, the Lo lamp unit LoLU, the AHi lamp unit AHiLU, and the lamp camera LCAM are mounted on an aiming bracket (first member of the present invention) 2 which can adjust a tilting angle. However, the Lo lamp unit LoLU and the A-Hi lamp unit AHiLU are mounted on a leveling bracket (second member of the present invention) 3 configured separately from the aiming bracket 2, and they are supported by the aiming bracket 2 via the leveling bracket 3. On the other hand, the lamp camera LCAM is mounted directly on the aiming bracket 2, and an imaging optical axis Ac of this lamp camera LCAM is oriented at a predetermined angle with respect to the aiming bracket 2.

The aiming bracket 2 is supported on the lamp body 11 by an aiming mechanism 20 that can tilt in an up-down direction and a left-right direction. In this aiming mechanism 20, it is configured such that the aiming bracket 2 is supported on the lamp body 11 by a fulcrum portion 21 at one corner, an up-down aiming adjustment portion 22 is arranged in a portion on a downward direction of the fulcrum section 21, and a left-right aiming adjustment portion 23 is arranged in a portion on a left direction of the fulcrum portion 21. The fulcrum portion 21 and the up-down or left-right aiming adjustment portions 22 or 23 employ well-known structures, so detailed description thereof will be omitted. For example, each of the fulcrum portion 21 and the aiming adjustment portions 22 or 23 is formed of an aiming screw and an aiming nut screwed thereon. By operating this aiming screw with a jig or the like, the aiming bracket 2 can adjust a forward tilting angle in the up-down direction and a deflection angle in a horizontal direction with the fulcrum portion 21 as a fulcrum.

The leveling bracket 3 is supported by the aiming bracket 2 by a leveling mechanism 30 that can tilt in the up-down direction. In this leveling mechanism 30, the leveling bracket 3 is supported on the aiming bracket 2 by fulcrum portions 31 and 32 at an upper edge portion of the leveling bracket 3, here, at two locations on the left and right of the upper edge. The leveling actuator LACT supported by the aiming bracket 2 is connected to a part of a lower edge of the leveling bracket 3. This leveling actuator LACT is formed of, for example, an electric motor 33 with a leveling screw 34, and a leveling nut 35 attached to a part of the lower edge of the leveling bracket 3 is screwed thereon. When the leveling actuator LACT is rotationally driven, the leveling nut 35 screwed on the leveling screw 34 is screwed forward, and along with this, the lower edge portion of the leveling bracket 3 is moved in the front-rear direction, and the forward tilting angle is controlled to change.

Here, in an initial state of the leveling mechanism 30, a relative forward tilting angle of the leveling bracket 3 with respect to the aiming bracket 2 is set to a predetermined angle, for example, zero degrees. In this initial state, illumination optical axes Al and Aa of the Lo lamp unit LoLu and the AHi lamp unit AHiLU mounted on the leveling bracket 3 are oriented in the same direction as the imaging optical axis Ac of the lamp camera LCAM.

Therefore, by adjusting the tilting angle of the aiming bracket 2 by the aiming mechanism 20, the directions of the optical axes Al, Aa, and Ac of the Lo lamp unit LoLU, the AHi lamp unit AHiLU, and the lamp camera LCAM can be collectively adjusted. In addition, by changing the forward tilting angle of the leveling bracket 3 with the leveling mechanism 30, the optical axis directions of the Lo lamp unit LoLU and the A-Hi lamp unit AHiLU can be changed and controlled at the same time.

Figure 4:
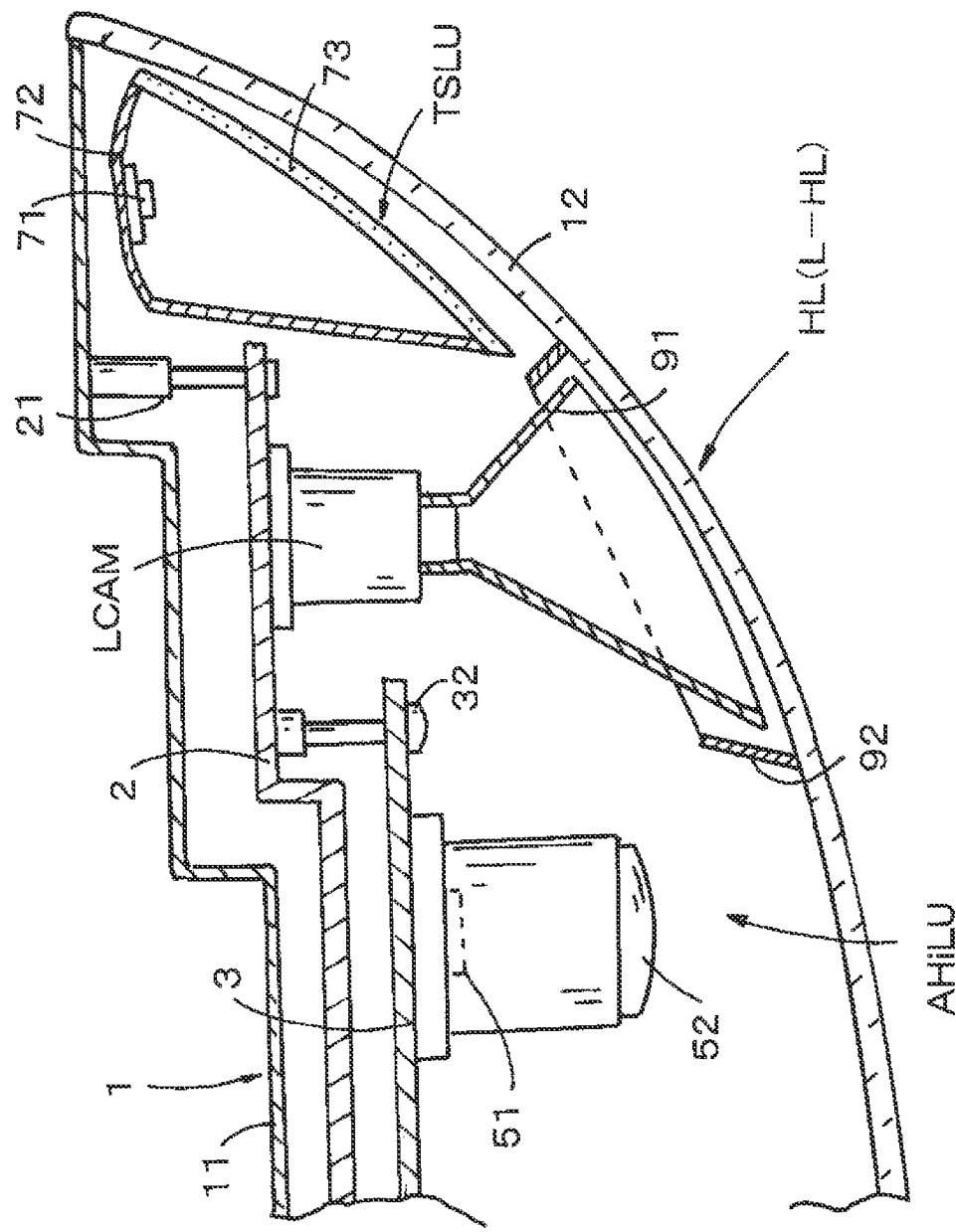
FIG. 4 is a schematic horizontal cross-sectional view of part of the left headlamp.

Each lamp unit will be briefly described. FIG. 4 is a schematic horizontal cross-sectional view of part on a vehicle width direction outer side of the headlamp HL. The TS lamp unit TSLU is configured to emit an amber light beam, and is arranged in a region directed outward in a vehicle width direction in the lamp housing 1, here next to the lamp camera LCAM. This TS lamp unit TSLU includes a light emitting diode (LED) 71 that emits a white light beam as a light source, a reflector 72 supported by the lamp body 11, and an inner lens 73 which is made of an amber translucent resin attached to an opening of the reflector 72. An inner surface of the reflector 72 is formed as a light reflecting surface by, for example, aluminum coating.

In this TS lamp unit TSLU, the LED 71 periodically emits a light beam under control of the lamp control unit 102 to light up in a blinking state. Here, the TS lamp unit TSLU is alternately turned on and off at intervals of one second. By this light emission, the white light beam from the LED 71 is changed to an amber light beam when passing through the inner lens 73, and is emitted from the headlamp HL. As the TS lamp unit TSLU, the light source may be formed of an LED that emits an amber light beam, and the inner lens may be formed of a colorless translucent resin to irradiate the amber light beam.

As illustrated in part in FIG. 2, the DR lamp unit DRLU is formed of a white LED 81 as a light source and a light guide (light guide) 82 made of translucent resin, and the light guide 82 is disposed to extend from an upper edge of the lamp housing 1 along an inner edge in a vehicle width direction. The white LED 81 is disposed opposite to an end surface of the light guide 82 in a length direction, and a light beam from the white LED 81 is guided in the length direction of the light guide 82 and is emitted from a side surface 82*a* of the light guide 82 directed toward a front of the headlamp HL as a light emitting surface.

Figure 5:
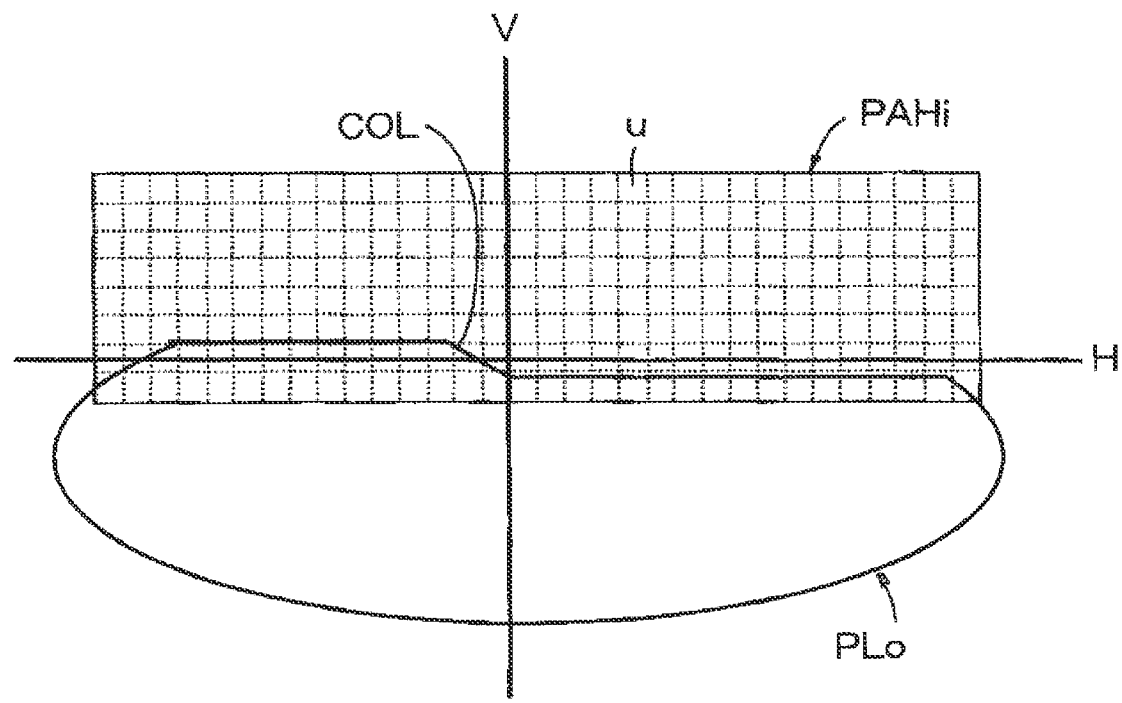
FIG. 5 is a pattern diagram of a Lo light distribution pattern and an AHi light distribution pattern.

As illustrated in FIG. 3, the Lo lamp unit LoLU has a configuration in which a light beam from a white LED 41 as a light source is reflected by a reflector 42, part of the light beam is blocked by a shade 43, and the light beam is projected forward by an irradiation lens 44. Since the irradiated light beam is partially blocked by the shade 43, a light distribution pattern of the light beam emitted by this Lo lamp unit LoLU becomes, as illustrated in FIG. 5, a light distribution pattern having a required cutoff line COL at an upper edge, a so-called low-beam light distribution pattern (hereinafter referred to as a Lo light distribution pattern) PLo.

As illustrated in FIG. 3, the AHi lamp unit AHiLU includes a multi-segmented LED array 61 and a projection lens 62 for projecting the light beam emitted from the multi-segmented LED array 61 forward. As illustrated in FIG. 5, the multi-segmented LED array 61 has a configuration in which a large number of micro LED light emitting elements (hereinafter referred to as pixel elements) 61*p* are arranged in a matrix. The multi-segmented LED array 61 selectively emits light beams from individual pixel elements 61*p* under the control of the lamp drive module LDM, and the emitted light beams from the pixel elements 61*p* forms a required light emission pattern. By projecting this light emission pattern with the projection lens 62, as illustrated in FIG. 4, an ADB high beam light distribution pattern (hereinafter referred to as AHi light distribution pattern) PAHi is formed by synthesizing a large number of unit illumination areas u corresponding to the respective pixel elements 61*p* in an upper area of the Lo light distribution pattern PLo.

The lamp camera LCAM is formed of a camera that captures at least a visible light region, and has the same focal length as the front camera FCAM, so it is configured to capture substantially the same forward region as the front camera FCAM. As described above, the lamp camera LCAM can perform imaging at a higher frame rate than that of the front camera FCAM. On the other hand, in order to reduce cost of the lamp camera LCAM, the resolution of the lamp camera LCAM is lower than that of the front camera FCAM. This lamp camera LCAM is connected to the vehicle ECU 100 via a local interconnect network (LIN) line 104 installed in an automobile, as illustrated in FIG. 1.

As illustrated in FIGS. 2 to 4, the lamp camera LCAM has, on a front surface, that is, on a side where an imaging lens (not illustrated) is arranged, a light shielding hood 91 in a shape of a quadrangular pyramid of which an opening dimension gradually increases toward the front. The light shielding hood 91 may be conical and tubular. On an inner surface of the translucent cover 12 facing the light shielding hood 91, a light shielding sleeve 92 in the shape of a rectangular tube larger than the light shielding hood 91 is attached so as to protrude rearward. The light shielding sleeve 92 is arranged so that a part of the light-shielding sleeve 92 overlaps the light-shielding hood 91 in a radial direction, and with this configuration, the light shielding sleeve 91 and the light shielding hood 92 form a light-shielding labyrinth.

The lamp drive module LDM has a function of receiving a lamp control signal from the vehicle ECU 100 and controlling lighting of each of the lamp units TSLU, DRLU, LoLU, and AHiLU, and a function to drive and control the multi-segmented LED array 61 in order to control a pattern shape of the AHi light distribution pattern performed in the AHi lamp unit AHiLU.

With the headlamp HL having the configuration described above, aiming adjustment is performed when the lamp housing 1 is attached to the vehicle body of the automobile CAR. In this aiming adjustment, by appropriately operating the up-down aiming adjustment portion 22 and the left-right aiming adjustment portion 23 of the aiming mechanism 20, up-down and left-right angles of the aiming bracket 2 are adjusted. Therefore, the directions of the illumination optical axes Al and Aa of the Lo lamp unit LoLU and the AHi lamp unit LAHiLu mounted on the aiming bracket 2 and the direction of the capturing optical axis Ac of the lamp camera LCAM are each set in a specific direction with respect to the vehicle body. This specific direction is preferably aligned with the imaging optical axis of the front camera FCAM. In addition, in the initial state, a relative forward tilting angle of the leveling bracket 3 with respect to the aiming bracket 2 is set to zero degrees as described above, and the illumination optical axes Al and Aa of the Lo lamp unit LoLu and the AHi lamp unit AHiLU and the imaging optical axis Ac of the lamp camera LCAM are oriented in the same direction.

Next, the lighting control operation of the headlamp HL will be described. When various switches (not illustrated) installed in the automobile CAR are turned on, a lamp control signal is output from the lamp control unit 102 of the vehicle ECU 100 to the lamp drive module LDM. The lamp drive module LDM controls lighting of the corresponding lamp unit based on this lamp control signal. For example, when a daytime running switch is turned on, the lighting of the DR lamp unit DRLU is controlled. When a turn signal switch is turned on, the lighting of the TS lamp unit TSLU is controlled. Furthermore, when a low beam switch is turned on, the Lo lamp unit LoLU is turned on to perform illumination according to the Lo light distribution pattern PLo illustrated in FIG. 5.

When an ADB switch is turned on, the lamp drive module LDM lights the Lo lamp unit LoLU and the AHi lamp unit AHiLU based on the lamp control signal from the vehicle ECU 100. At the same time, the lamp drive module LDM performs light emission control of the multi-segmented LED array 61 of the AHi lamp unit AHiLU based on the lamp control signal, so a light emission pattern is formed by the pixel elements 61p that emit light beams selectively, and the light distribution control of the AHi light distribution pattern PAHi illustrated in FIG. 5 is executed by projecting this light emission pattern.

In the light distribution control of this AHi light distribution pattern PAHi, the vehicle ECU 100 detects an object based on images captured by the front camera FCAM and the lamp camera LCAM in the object detection unit 101. That is, the front camera FCAM and the lamp camera LCAM capture an image of the front area illuminated by the illuminated Lo lamp unit LoLU and AHi lamp unit AHiLU.

Figure 7A:
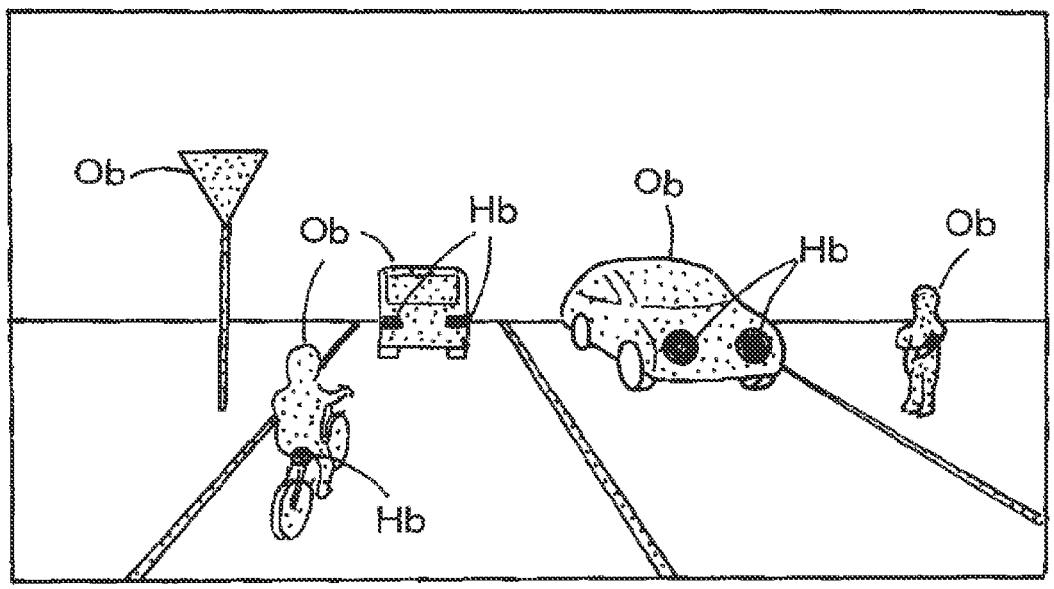
FIG. 7A is a schematic view of an image captured by a front camera FCAM.

FIG. 7A is a view schematically illustrating an image captured by the front camera FCAM. Since the front camera FCAM has a high resolution, there is little deformation of an imaged object Ob. Therefore, the object detection unit 101 can detect the shape (outer shape), size, and the like of the object Ob from this image with high accuracy. In addition, when it is difficult to directly detect the object Ob from the image captured by the front camera FCAM, a high brightness portion (black portion in the figure) Hb in the image is detected.

The detected high brightness portion Hb is due to a light beam emitted by the object itself or a light beam reflected by the object. Then, by detecting attributes such as color, luminance (brightness), size, and the like of the detected high brightness portion Hb and comparing these attributes with a predetermined table, it detects whether the object of a bright spot is another vehicle (a preceding vehicle, an oncoming vehicle, a bicycle, and the like), a pedestrian, a road sign, or something else. For example, a high brightness portion having a brightness higher than a predetermined level can be detected as another vehicle because it is based on the self-luminescence of the object. In the case of another vehicle, when the high brightness portion is white, it is detected as an oncoming vehicle, and when it is red, it is detected as a preceding vehicle. A high brightness portion of which the brightness is lower than a predetermined level is based on the reflected light beam, so it can be detected as a pedestrian or a road sign.

Figure 7B:
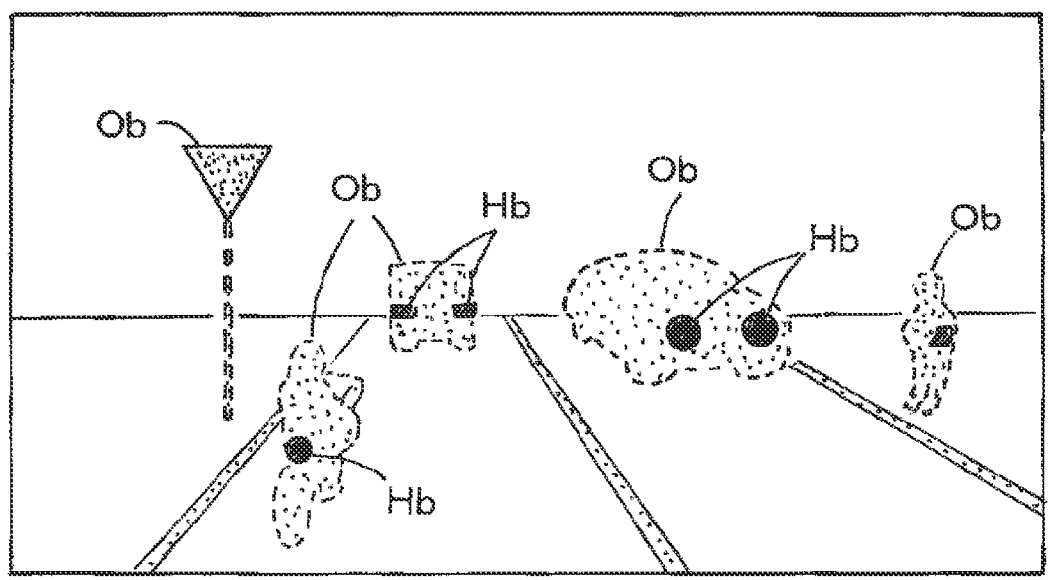
FIG. 7B is a schematic view of an image captured by a lamp camera LCAM.

The object detection unit 101 also detects the high brightness portion Hb in the image captured by the lamp camera LCAM. FIG. 7B is a view schematically illustrating an image captured by the lamp camera LCAM. Since the resolution of the lamp camera LCAM is lower than that of the front camera FCAM, the captured image of the object Ob may be deformed, and it may be difficult to accurately detect the object Ob. However, since the optical axis of the lamp camera LAM is directed in the same direction as that of the front camera FCAM, the images captured by the respective cameras can be matched one-to-one. Therefore, by comparing the high brightness portion Hb of the image captured by the lamp camera LCAM with the image captured by the front camera FCAM, it is possible to detect the object Ob with the high brightness portion Hb. Further, since lamp camera LCAM has a faster frame rate than the front camera FCAM, the object detection unit 101 can detect a positional change of the detected object Ob at high speed by detecting a temporal positional change of the high brightness portion Hb of the captured image.

Further, the object detection unit 101 can also detect positional information of the detected object Ob, that is, a relative position (direction, distance) from the own vehicle to the object Ob, and the positional change of the object Ob. In particular, since the lamp camera LCAM has a faster frame rate than the front camera FCAM, the object detection unit 101 can detect the positional information of the detected object Ob at high speed by detecting a temporal positional change of the high brightness portion Hb of the captured image.

In the vehicle ECU 100, upon detection by the object detection unit 101, the lamp control unit 102 generates a lamp control signal related to light distribution control and outputs it to the headlamp HL. In generating the lamp control signal, a lamp control signal is generated for controlling the brightness of the illumination light beam for the object. For example, when the detected object is a road sign, a lamp control signal that does not dim the illumination light beam is generated. When the object is a pedestrian, a lamp control signal is generated for dimming the illumination light beam to a predetermined level. When the object is another vehicle (preceding vehicle, oncoming vehicle, bicycle, or the like), a control signal for maximally dimming the illumination light beam, or a lamp control signal for blocking the illumination light beam normally is generated.

The lamp control unit 102 associates the position of the object with the unit illumination area u of the AHi light distribution pattern PAHi, and determines the unit illumination area u containing the object Ob. In this determination, depending on the type of object, areas surrounding the high brightness portion with a predetermined margin are determined as an area containing the object Ob. When the shape and size of the object are detected from the high-resolution front camera image, the unit illumination area can be determined based on this detection. For example, as illustrated in FIG. 7A, in the case of an oncoming vehicle in which two white high brightness portions Hb are detected at a required interval, a number nx containing two high brightness portions in the horizontal direction and a number my (m=k·n) obtained by multiplying a preset coefficient k in a vertical direction are detected, and these nx X my unit illumination areas are assumed to be an area in which the oncoming vehicle exists. The coefficient k is a ratio of an average vehicle width dimension to a vehicle height dimension. Approximately the same is the case for a preceding vehicle in which two red high brightness portions are detected at a required interval. Although illustration is omitted, the case of an oncoming vehicle in which two white high brightness portions are detected at a required interval is almost the same.

Figure 6:
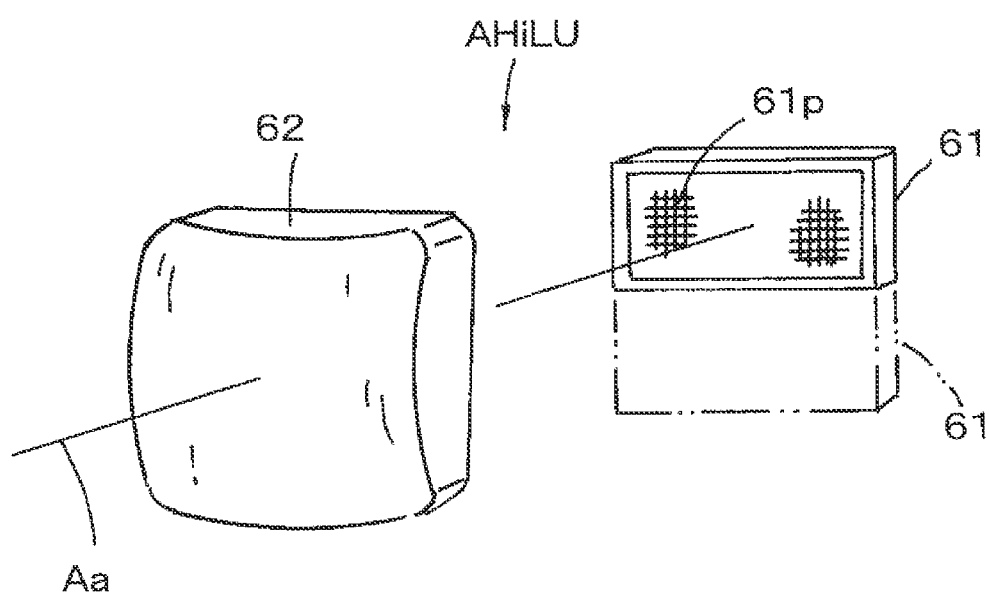
FIG. 6 is a schematic configuration view of an AHi lamp unit.

A lamp control signal generated by the lamp control unit 102 is output to the lamp drive module LDM and the leveling actuator LACT of the headlamp HL. The lamp drive module LDM individually controls light emission of each pixel element 61p of the multi-segmented LED array 61 (see FIG. 6) of the AHi lamp unit AHiLu based on this lamp control signal. That is, the pixel elements 61p of the multi-segmented LED array 61 which correspond to the unit illumination areas u determined that the object exists are determined, and then the determined pixel elements 61p are controlled to be extinguished or dimmed, and the other pixel elements 61p are controlled to emit light beams.

Figure 8A:
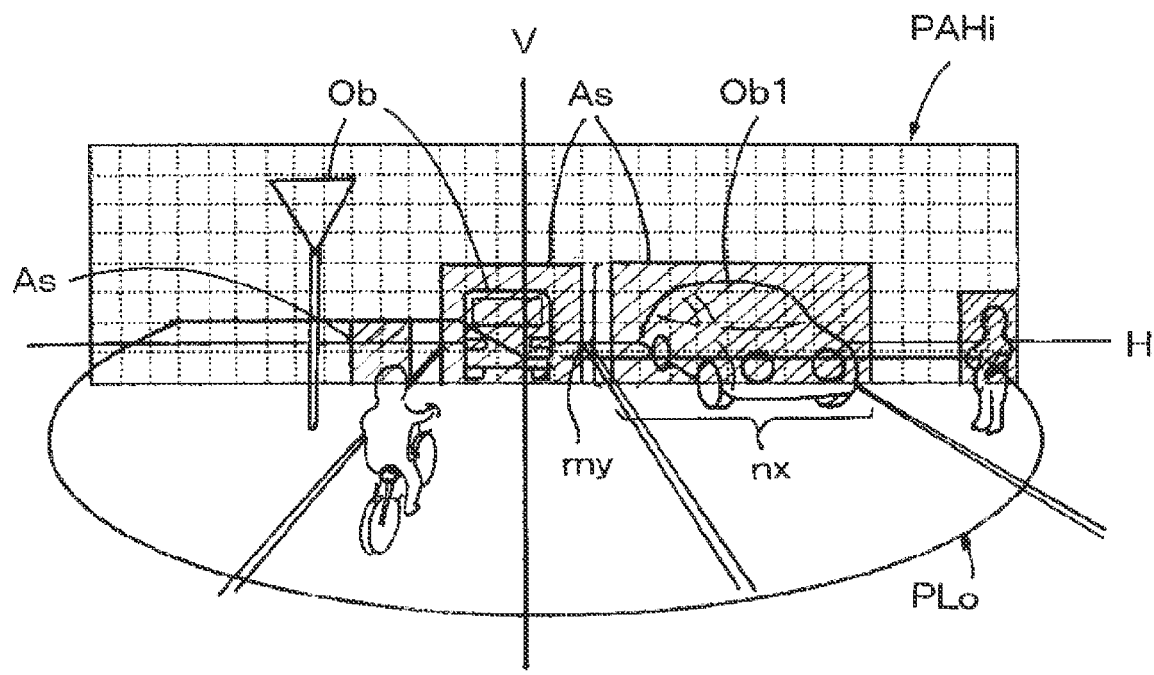
FIG. 8A is a schematic diagram of a light distribution pattern based on leveling control when forming a light shaded area in which a corresponding pixel element is extinguished in a unit illumination area in which another vehicle exists, and lighting is not performed.
Figure 10:
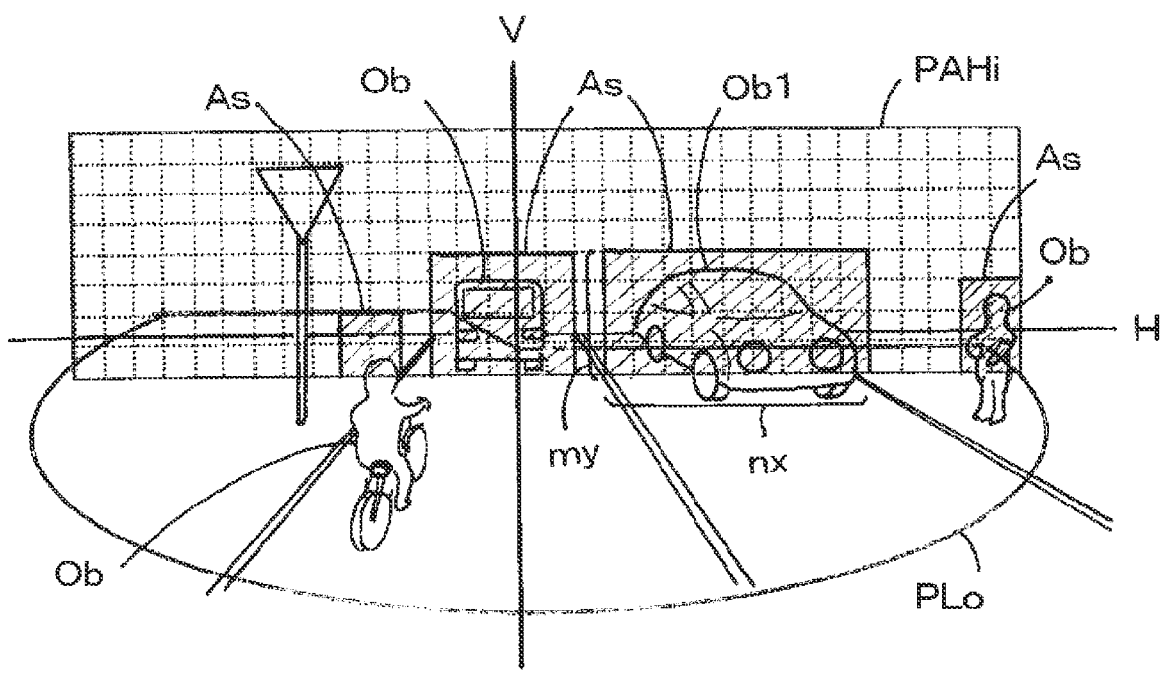
FIG. 10 is a schematic diagram of a light distribution pattern based on ADB control.

As illustrated in FIGS. 8A and 10, by leveling control and ADB control, in the unit illumination areas u where other vehicles such as preceding vehicles, oncoming vehicles, bicycles, and the like exist, the corresponding pixel elements 61p are extinguished as indicated by thick frames to form a light shaded area As that does not perform illumination. As a result, the light shaded area As illustrated by hatching lines is not illuminated with the PAHi light distribution pattern PAHi, thereby preventing other vehicles from being dazzled. In the light shaded area, the pixel elements 61p may emit light beams with a low luminosity for a pedestrian, or the like, and thus while preventing dazzling of the pedestrians, it is possible to confirm the pedestrians by lighting them with the illumination light beams of the own vehicle. For other object areas, the pixel elements 61p are illuminated with a predetermined luminosity. Thereby, for example, a road sign can be brightly illuminated by the illumination light beam of the own vehicle.

By the way, as the automobile CAR travels, the relative positions of the objects to be detected change over time. Therefore, when the object Ob moves to an area close to a lower edge of the AHi light distribution pattern PAHi, the illumination effect of the AHi light distribution pattern PAHi may be reduced. For example, in a situation of FIG. 8A, when an oncoming vehicle Ob1 moves to the lower edge of the light shaded area As, a lower part of the oncoming vehicle Ob1 and a road surface in front of it are shaded, and the brightness of the lighting in these areas is lowered, which may cause a problem in safe driving.

such deterioration of the lighting effect occurs, the object detection unit 101 of the vehicle ECU 100 detects a change in the position of the oncoming vehicle Ob1 and a situation in which the illumination on the oncoming vehicle Ob1 has decreased from the high brightness portions of the images of the cameras FCAM and LCAM. Further, the lamp control unit 102 changes the lamp control signal related to the light distribution control in accordance with the up-down positional change in the image of the oncoming vehicle Ob1 and the deterioration situation of the illumination, and outputs the changed lamp control signal to the headlamp HL.

Figure 8B:
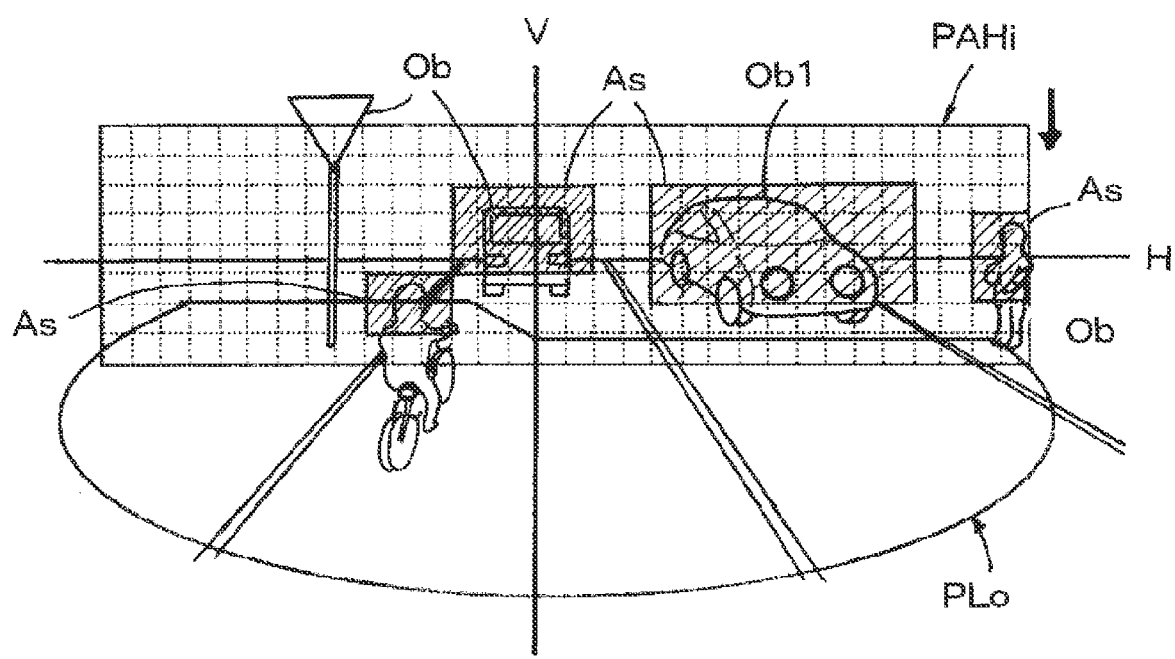
FIG. 8B is a schematic diagram of a light distribution pattern based on leveling control when each illumination optical axis of the Lo lamp unit and the AHi lamp unit is controlled to change downward.

In the headlamp HL, the leveling actuator LACT is driven by this lamp control signal to perform leveling control, and the forward tilting angle of the leveling bracket 3 is controlled to change, and further the respective illumination optical axes of the Lo lamp unit LoLU and the AHi lamp unit AHiLU mounted thereon is controlled to change in the up-down direction. In this example, as illustrated in FIG. 8B, the forward tilting angle of the leveling bracket 3 is increased, and the illumination optical axes of the Lo lamp unit LoLU and the AHi lamp unit AHiLU are controlled to change downward. As a result, the Lo light distribution pattern PLo and the AHI light distribution pattern PAHi are also changed downward.

At the same time, the lamp drive module LDM controls the light shaded area As of the AHi light distribution pattern PAHi of the AHi lamp unit AHiLU based on the lamp control signal. As a result, as illustrated in FIG. 8B, the lower part of the oncoming vehicle Ob1 and the road surface in front of it are illuminated, and suitable illumination is ensured by the Lo light distribution pattern PLo and the AHi light distribution pattern PAHi.

In this leveling control, the lamp control unit 102 generates a lamp control signal related to leveling control based on the object detected from the image captured by the lamp camera LCAM, enabling leveling control with high responsiveness to the positional change in the object. That is, since the lamp camera LCAM can capture an image at a higher frame rate than the front camera FCAM, the object detection unit 101 can detect the positional change of the object at high speed, and the lamp control unit 102 can generate a lamp control signal highly responsive to the positional change and perform leveling control. Although the lamp camera LCAM has a lower resolution than the front camera FCAM, the positional change in the object can be obtained from an amount of movement of the high brightness portion in the captured image. Therefore, even when the resolution is low, there is no problem in detecting the positional change.

Also, in this leveling control, only the Lo lamp unit LoLU and the AHi lamp unit AHiLU mounted on the leveling bracket 3 are tilted, and the lamp camera LCAM mounted on the aiming bracket 2 is not tilted. That is, the lamp camera LCAM and the front camera FCAM have their imaging optical axes fixed in a specified direction with respect to the automobile CAR. Since these imaging optical axes are reference positions in the image captured by the lamp camera LCAM as described above, it is not affected by the tilting of the leveling bracket 3, that is, the tilting of the Lo lamp unit LoLU and the AHi lamp unit AHiLu. Therefore, compared to the case where the imaging optical axis of the lamp camera LCAM is tilted together with the lamp unit, a process when detecting the object is simplified, and thus faster leveling control can be realized.

Incidentally, in the case where the imaging optical axis of the lamp camera LCAM is tilted together with the lamp units LoLu and AhiLU, when detecting the position of the object from the captured image, an angle of the imaging optical axis of the lamp camera LCAM is detected from a driving position of the leveling actuator LACT. Then, it is necessary to perform correction processing such as calculating a difference between the position of the object obtained from the image and the detected angle of the imaging optical axis of the lamp camera LCAM. In this embodiment, this correction processing becomes unnecessary.

Furthermore, since the lamp camera LCAM is arranged at almost the same height position as the Lo lamp unit LoLU and the AHi lamp unit AhiLU, the angle change of the imaging optical axis when the object is viewed from the lamp camera LCAM along with the positional change of the object is substantially the same as the angle change when the object is irradiated with light beams from the Lo lamp unit LoLU and the AHiLU lamp unit AHiLU. Therefore, a process when detecting a positional change amount (movement amount) of the high brightness portion detected by the lamp camera LCAM is further simplified, and thus faster leveling control can be realized.

It is conceivable to perform light distribution control for changing only the AHi light distribution pattern PAHi emitted from the AHi lamp unit AHiLU in the up-down direction without performing leveling control with respect to the positional change of the object. However, since the positional change of an object such as an oncoming vehicle is fast, ss in the embodiment, rather than controlling the light distribution of the AHi lamp unit AHiLU, it is easier to perform leveling control that controls the movement of the entire light distribution pattern in the up-down direction in addition to or without changing the AHi light distribution pattern PAHi, and further highly responsive control can be obtained.

Although the above-described embodiment has a configuration including the Lo lamp unit LoLU and the AHi lamp unit AHiLU, it may be configured with only the AHi lamp unit. For example, as the configuration of the AHi lamp unit AHiLU illustrated in FIG. 6, a configuration in which a plurality of, for example, two multi-segmented LED arrays 61 are disposed vertically as indicated by the chain line may be employed. In this case, for example, a projection lens is preferably configured as a compound lens having two focal points above and below so that AHi light distribution patterns PAHi formed by the respective multi-segmented LED arrays 61 are projected in vertical contact with each other.

Figure 9:
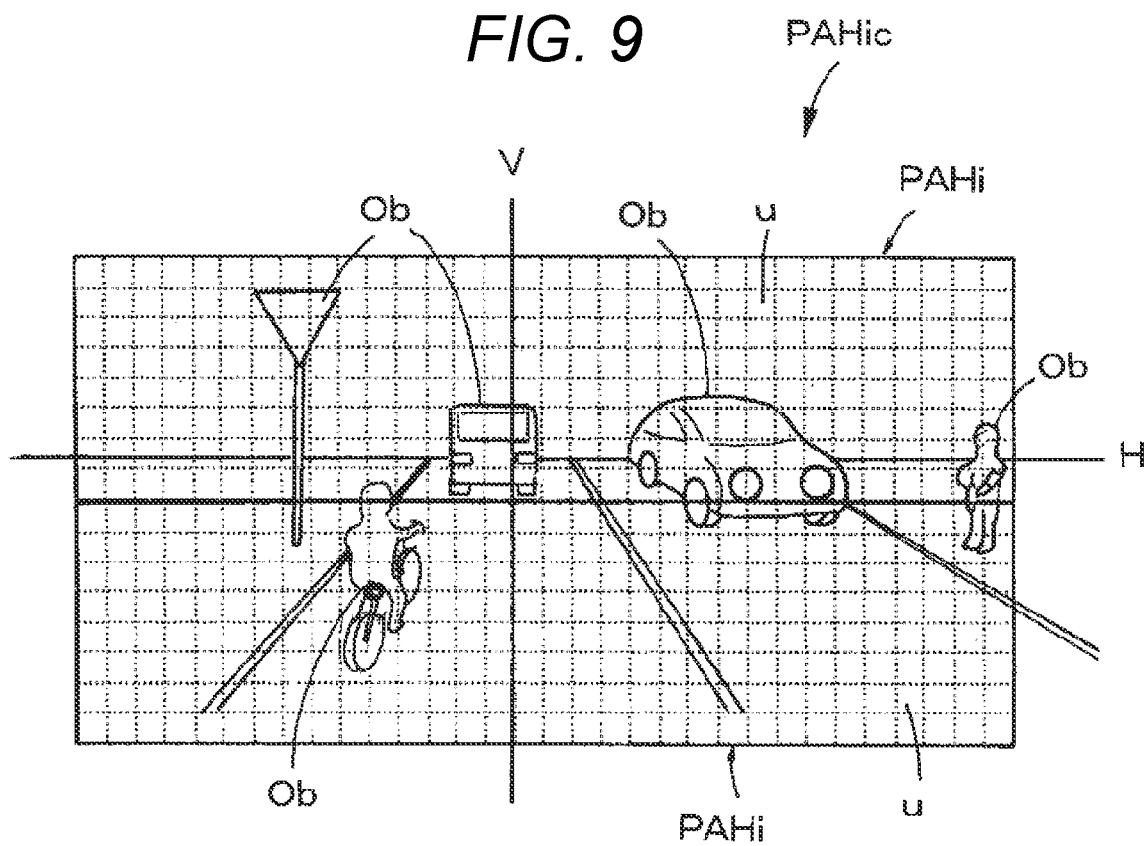
FIG. 9 is a pattern diagram of an AHi light distribution pattern of an AHi lamp unit of a modification example.

By providing these two multi-segmented LED arrays 61, a composite AHi light distribution pattern PAHic is formed by combining two vertically arranged AHi light distribution patterns PAHi, as illustrated in FIG. 9. In this case, only the AHi lamp unit AHiLU is mounted on the leveling bracket 3, and leveling control is performed by the leveling actuator LACT.

In light distribution pattern control and leveling control, as described above, the object detection unit 101 detects an object from an image obtained from an imaging signal picked up by the lamp camera LCAM. In this case, when the light beam from each lamp unit leaks into the lamp camera LCAM, the contrast and sharpness of the captured image will be reduced, causing problems such as a reduction in object detection accuracy.

Regarding light leakage from such a lamp unit, as illustrated in FIG. 2, in the lamp housing 1 of the headlamp HL, the Lo lamp unit LoLU, the AHi lamp unit AHiLU, and the DR lamp unit DRLU are arranged further on a front side than the lamp camera LCAM. Thus, the light beams emitted by these lamp units rarely leak to the lamp camera LCAM. In addition, in the embodiment, since the lamp camera LCAM is provided with a light shielding labyrinth formed of the light shielding hood 91 and the light shielding sleeve 92, this light shielding labyrinth can more effectively prevent light beams from leaking into the lamp camera LCAM.

The TS lamp unit TSLU is adjacent to the lamp camera LCAM, is disposed further on a rear side than the lamp camera LCAM, and part of the light irradiation area of the TS lamp unit TSLU is directed to a side of the vehicle. Therefore, the amber light beams emitted from the TS lamp unit TSLU are reflected in various directions by an inner surface of the lamp housing 1, especially inner and outer surfaces of the translucent cover 12, and thus some of the amber light beams leak into the lamp camera LCAM and interferes with object detection. In particular, since the TS lamp unit TSLU periodically blinks according to the lamp control signal from the lamp control unit 102, the contrast and sharpness of the image captured by the lamp camera LCAM will be reduced in accordance with a lighting cycle of the TS lamp unit TSLU, making signal processing difficult when detecting an object.

Figure 11:
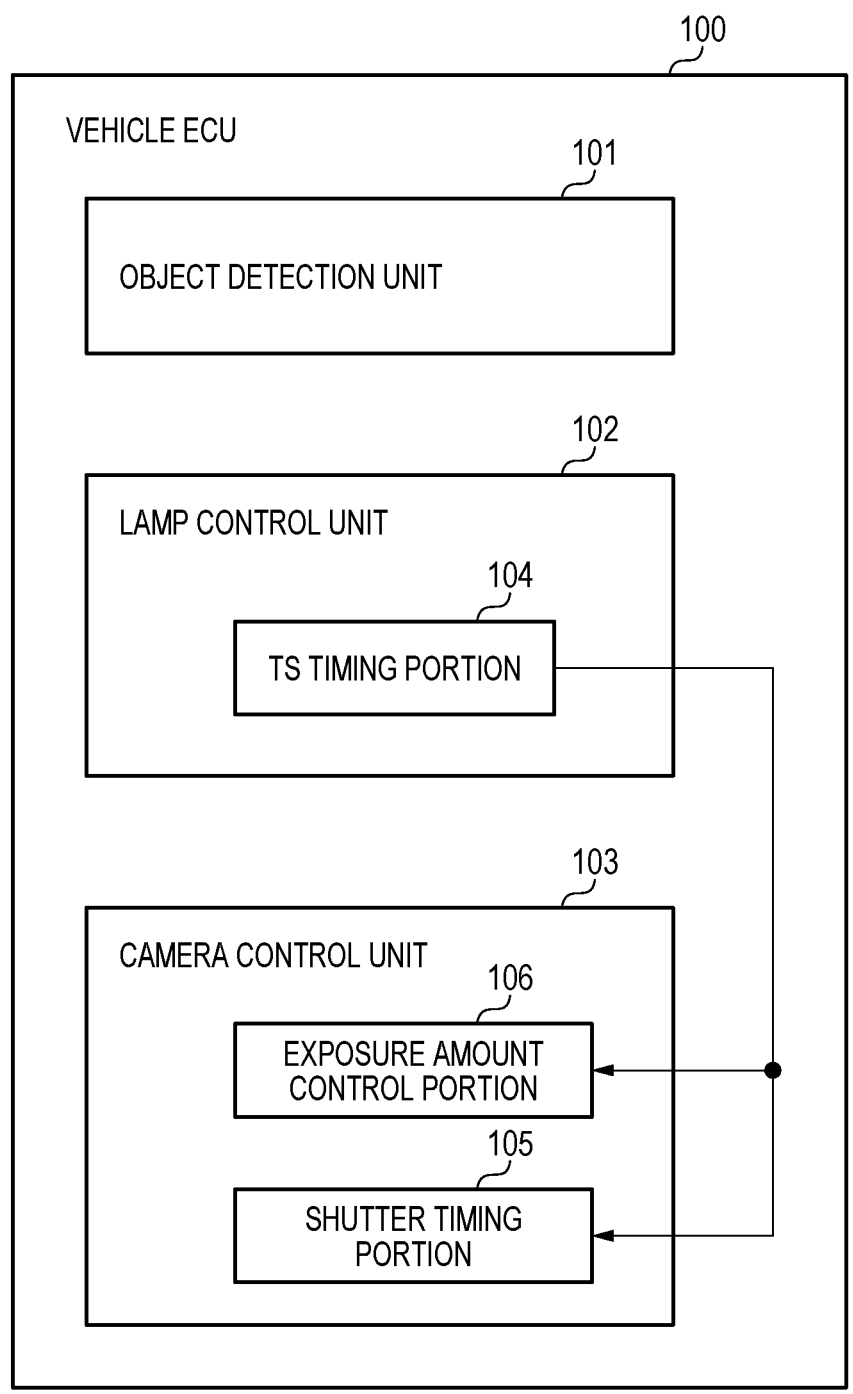
FIG. 11 is a block configuration diagram of a vehicle ECU.

As illustrated in FIG. 11, in order to suppress the obstruction of object detection due to such leakage of light beams, the lamp control unit 102 of the vehicle ECU 100 is provided with a TS timing portion 104 that outputs a blinking signal for controlling blinking of the TS lamp unit TSLU. Also, in the camera control unit 103, a shutter timing portion 105 for controlling shutter timing in the lamp camera LCAM based on a timing signal input from the TS timing portion and an exposure amount control portion 106 for controlling an exposure amount are provided.

Figure 12:
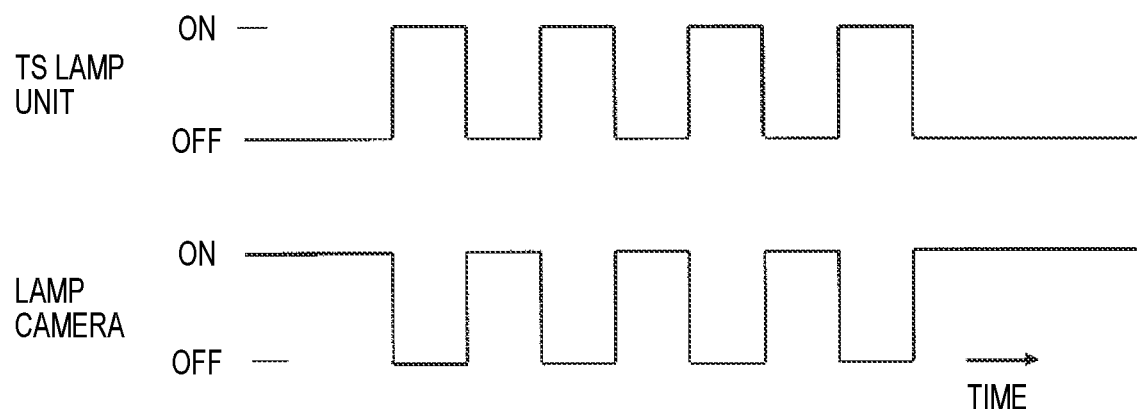
FIG. 12 is an operation timing chart of one form of a lamp camera.

Then, as one form of hindrance suppression control due to light leakage, the camera control unit 103 takes in a blinking signal output from the TS timing portion 104 of the lamp control unit 102, controls the shutter operation of the lamp camera LCAM based on this blinking signal, and controls imaging timing. FIG. 12 is a timing chart for this. When the blinking signal is OFF, that is, when the TS lamp unit TSLU is turned off, the lamp camera LCAM takes an image, whereas when the blinking signal is ON, that is, when the TS lamp unit TSLU is turned on, the imaging operation of the lamp camera LCAM is stopped.

This control of the periodic imaging operation is, for example, mechanical control of closing the shutter of the lamp camera LCAM when the TS lamp unit TSLU is turned on and opening the shutter of the lamp camera LCAM when the TS lamp unit TSLU is turned off.

Alternatively, as a modification example of this form of hindrance suppression control, it may be a software control in which the output of the imaging signal captured by the lamp camera LCAM to the object detection unit 101 is blocked when the TS lamp unit TSLU is turned on, and the imaging signal captured by the lamp camera LCAM is output to the object detection unit 101 when the TS lamp unit TSLU is turned off.

By performing such camera control, even with the headlamp HL that makes it difficult to prevent the light beam from the TS lamp unit TSLU from leaking to the lamp camera LCAM, the actual imaging operation by the lamp camera LCAM is stopped at the timing when the TS lamp unit TSLU is turned on. As a result, the object detection unit 101 is prevented from detecting the object based on the image in which the light beam is leaked, and thus deterioration of the detection accuracy of the object caused by the light leakage can be prevented. Therefore, the light distribution control of the Lo lamp unit LoLU and the AHi lamp unit AHiLU performed in the lamp control unit 102, that is, the control of the light distribution pattern and the control of the illumination optical axis direction, can be performed appropriately. As a result, suitable light distribution control can be realized.

Also, since in this embodiment, the lamp camera LCAM is supported by the aiming bracket 2 and not supported by the leveling bracket 3, even when the Lo lamp unit LoLU and the AHi lamp unit AHiLU are leveling-controlled, the lamp camera LCAM is not tilted and the imaging optical axis is kept substantially constant. Therefore, it is possible to improve an effect of suppressing leakage of light beams from the TS lamp unit TSLU to the lamp camera LCAM due to the change in the direction of the imaging optical axis of the lamp camera LCAM during leveling control.

Figure 13:
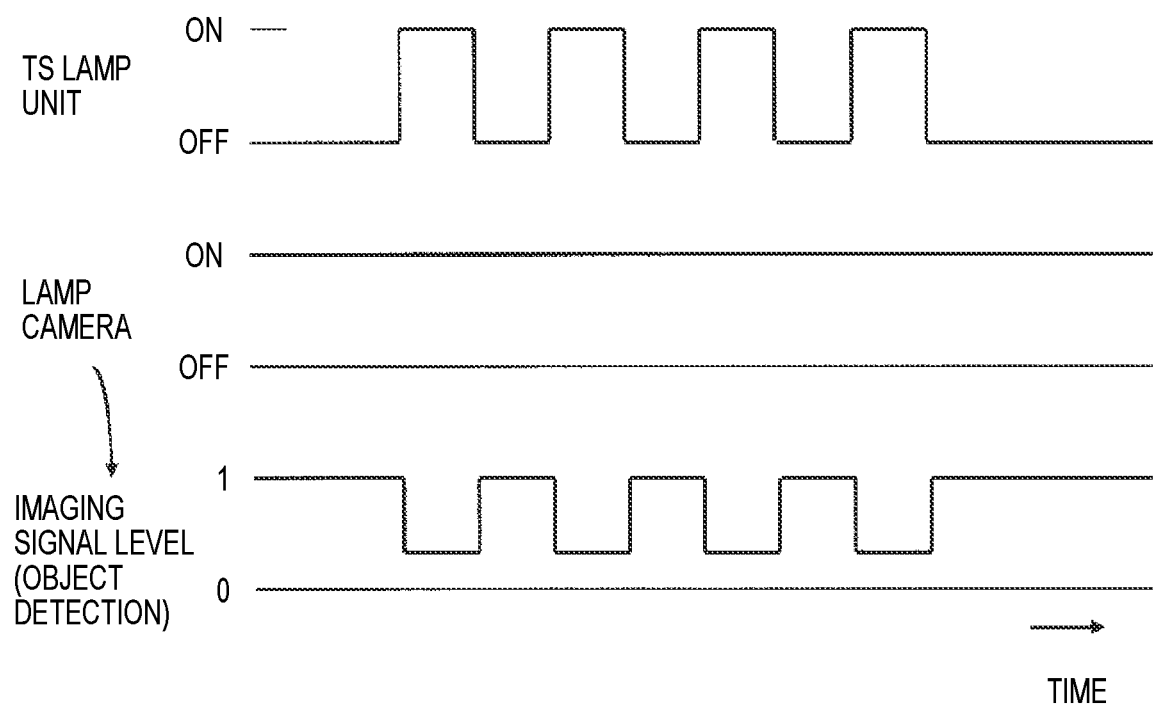
FIG. 13 is an operation timing chart of another form of the lamp camera.

As another form of hindrance suppression control due to light leakage, as software imaging control in the lamp camera LCAM, as illustrated in FIG. 13, the lamp camera LCAM may always capture images regardless of the blinking of the TS lamp unit TSLU, and the level of the imaging signal captured by the lamp camera LCAM may be lowered at the timing when the TS lamp unit TSLU is turned on. In the object detection unit 101, the signal level of the imaging signal picked up by the lamp camera LCAM is lowered, so that influence of flashing light from the TS lamp unit TSLU can be suppressed.

In the case of this fault suppression control, it is also possible to compare the signal level of the imaging signal captured at the timing when the TS lamp unit TSLU is turned on with a predetermined threshold value, and to acquire only the imaging signal having the signal level below the threshold value. This threshold value is set to a signal level that has little effect on deterioration of image quality due to light leakage.

Figure 14:
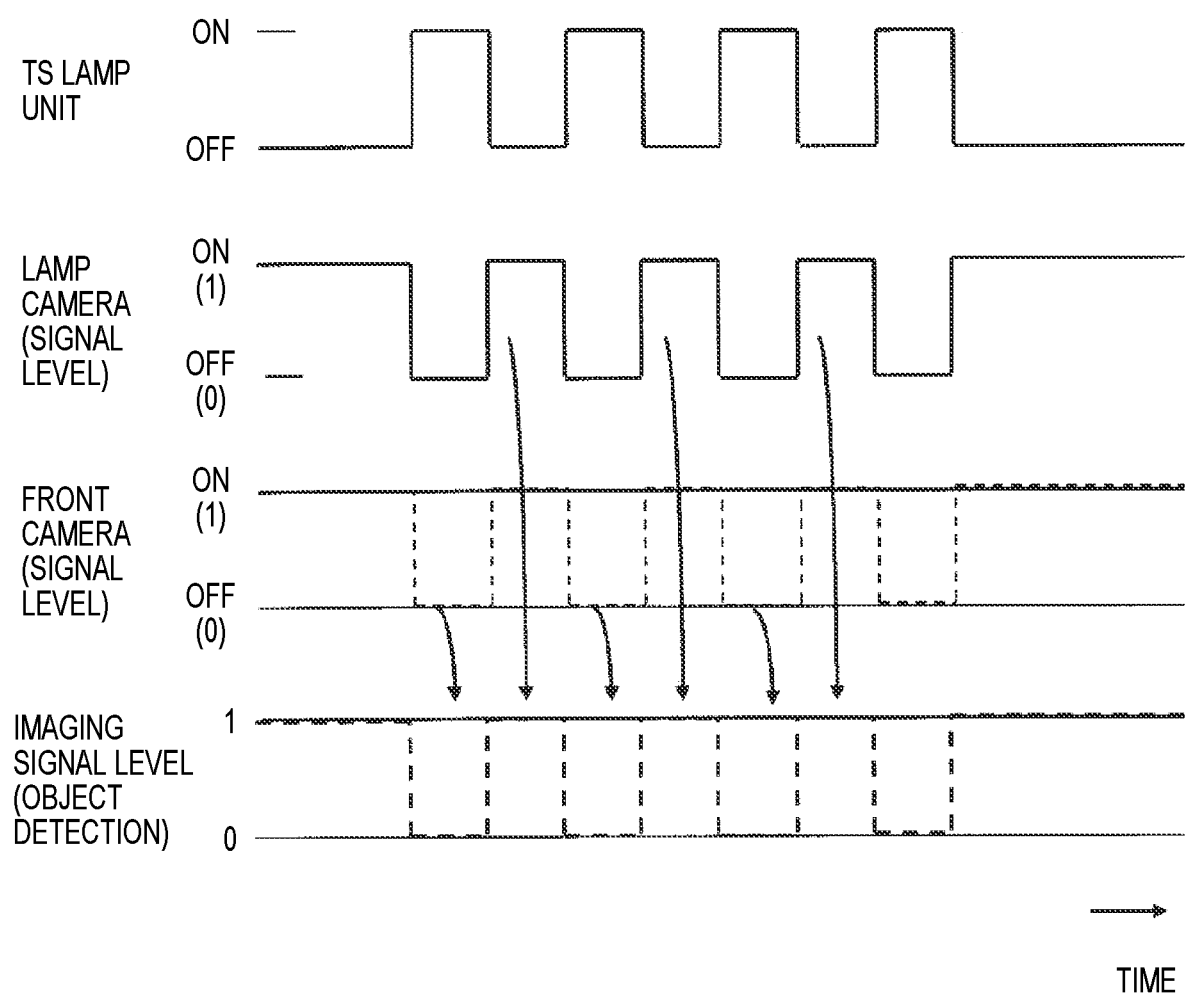
FIG. 14 is an operation timing chart of still another form of the lamp camera.

Also, as in the case of FIG. 12, in the case of periodically controlling the imaging timing of the lamp camera LCAM, or in the case of control for periodically lowering the imaging signal, timings at which imaging signals cannot be obtained periodically occur, making it difficult to continuously detect positional changes of the object. Therefore, in the object detection unit 101, as another form of hindrance suppression control, as illustrated in a timing chart of FIG. 14, at the timing when the image signal from the lamp camera LCAM is not input, the image signal captured by the front camera FCAM (second camera in the present invention) may be taken. The front camera FCAM has a lower imaging speed than the lamp camera LCAM, but since the image is only used at the timing when the lamp camera LCAM does not perform imaging, there is little problem in detecting the object. This is the same at the timing when the imaging signal of the lamp camera LCAM is suppressed.

Further, as a hindrance suppression control in the present invention, a spectral filter for blocking amber light beams may be provided in the lamp camera LCAM to block amber light beams from the TS lamp unit TSLU and prevent amber light beams from leaking to the lamp camera. Alternatively, in the camera control unit 103, control for dispersing the imaging signal when imaging with the lamp camera LCAM into frequency components and filter and remove the frequency component of the amber light beam, that is, soft filter control, may be performed. In the form of removing amber light beams to prevent light leakage, since amber light beams emitted by objects such as oncoming vehicles and preceding vehicles captured by the lamp camera LCAM are removed, it can be applied when there is no need to detect the amber light beams of the object.

Figure 15A:
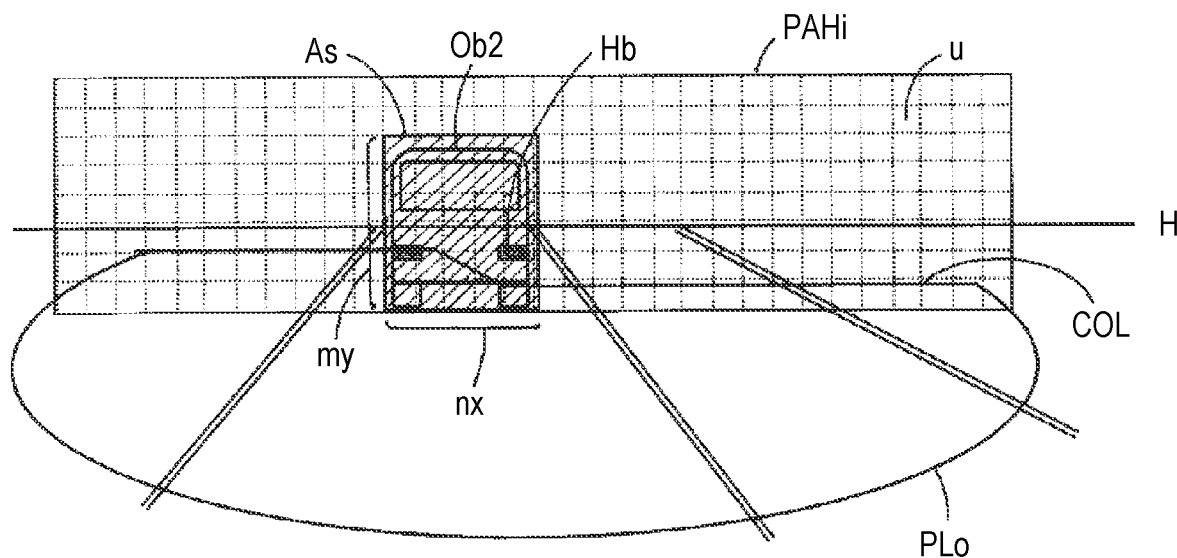
FIG. 15A is a light distribution pattern diagram for illustrating the ADB control and a dark zone when a light shaded area is formed in which a corresponding pixel element is extinguished in a unit illumination area in which a preceding vehicle exists, and lighting is not performed.

As illustrated in FIG. 15A, by this light distribution control, in a unit illumination area u in which a preceding vehicle Ob2 exists, corresponding pixel elements 61*p* are extinguished as indicated by a thick frame to form a light shaded area As that does not perform illumination. As a result, the light shaded area As illustrated by hatching lines is not illuminated by the PAHi light distribution pattern PAHi, thereby preventing the preceding vehicle Ob2 from being dazzled. Also, although illustration is omitted, regarding the light shaded area for pedestrians or the like, the pixel elements 61*p* may emit light beams with low luminosity, and while preventing dazzling pedestrians, it is possible to confirm pedestrians by lighting with the illumination light beams of the own vehicle. For other object areas, pixel elements 61*p* are illuminated with a predetermined luminosity. Thereby, for example, a road sign can be brightly illuminated by the illumination light beams of the own vehicle.

As illustrated schematically in FIG. 16, in the Lo lamp unit LoLU, the cutoff line COL of the Lo light distribution pattern PLo is set to a required height position of a rear surface of the vehicle body of the preceding vehicle Ob2 indicated by the dashed line, which is assumed to be positioned at a predetermined distance in front of the automobile CAR. During normal traveling of the automobile CAR, ADB control is performed with the AHi light distribution pattern PAHi, so that the preceding vehicle Ob2 is not dazzled and no dark zone occurs. However, as illustrated by the solid line, when a relative position of the preceding vehicle Ob2 with respect to the automobile CAR changes and an inter-vehicle distance increases, the cutoff line COL is positioned on a road surface in front of the preceding vehicle Ob2. Therefore, a dark zone DZ (cross hatched region) in which illumination is not performed occurs in a partial area of a road surface between the preceding vehicle Ob2 and the automobile CAR, particularly an area directly behind the preceding vehicle Ob2.

Figure 15B:
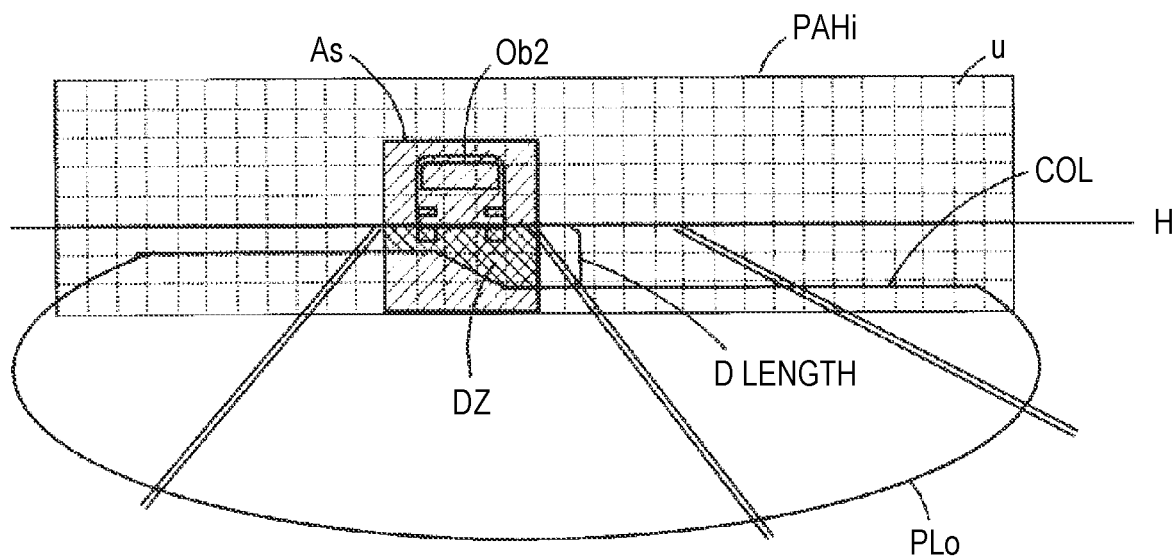
FIG. 15B is a light distribution pattern diagram for illustrating the ADB control and the dark zone when an inter-vehicle distance between the preceding vehicle and own vehicle is long.

In an example of FIG. 15A, as illustrated in FIG. 15B, when the inter-vehicle distance between the preceding vehicle Ob2 and the own vehicle becomes long, the preceding vehicle Ob2 is moved to an area above the cutoff line COL. Therefore, a dark zone DZ illustrated by diagonal lines is generated between the light shaded area As (cross hatched region) of the AHi light distribution pattern PAHi and the cutoff line COL, that is, in part of a non-illuminated area above the Lo light distribution pattern PLo. The lamp control unit 102 controls the headlamp HL based on this dark zone DZ to perform dark zone control.

Figure 17:
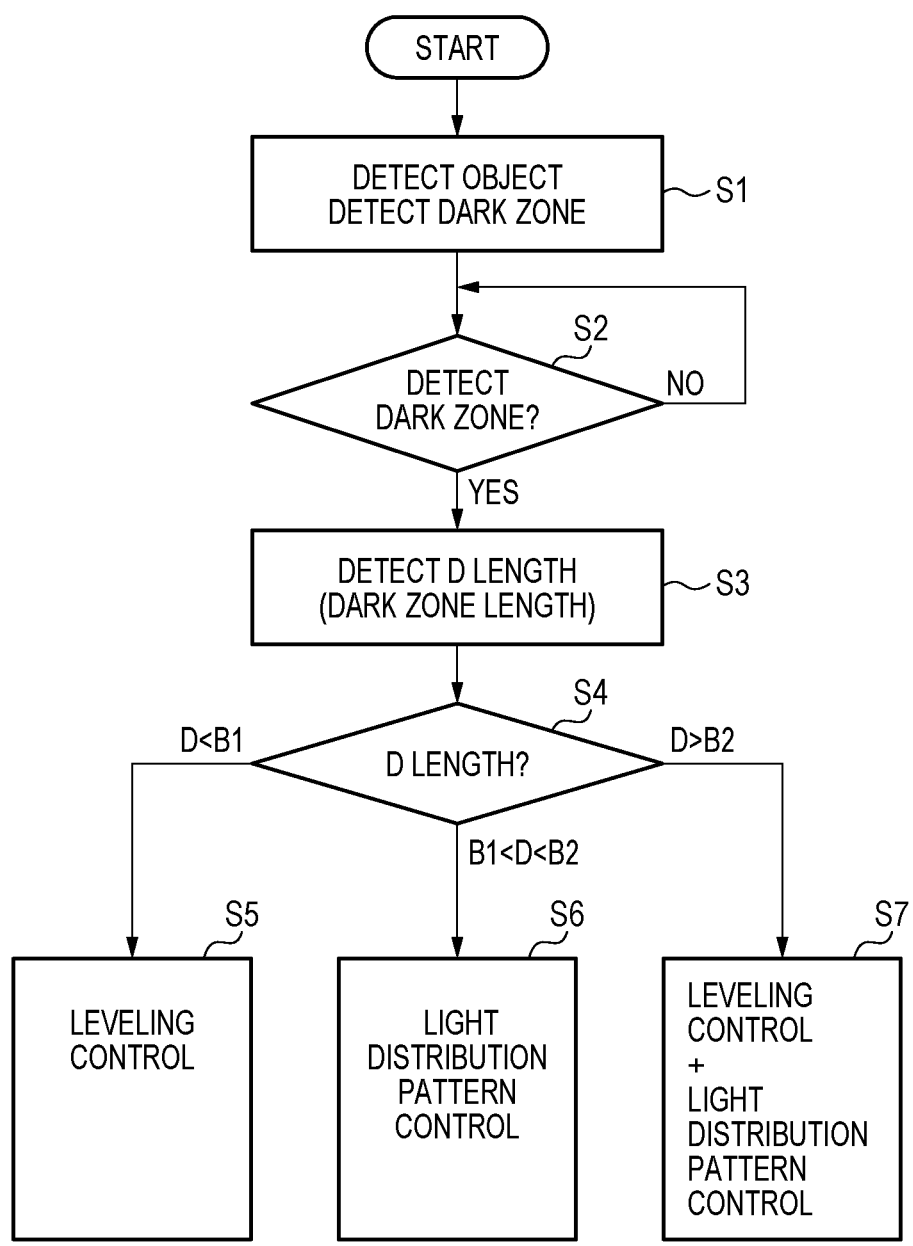
FIG. 17 is a flow diagram of dark zone control.

FIG. 17 is a schematic flow diagram of this dark zone control. The object detection unit 101 detects an object and simultaneously detects a dark zone DZ (S1). The dark zone DZ is detected from dark portions in images of the cameras FCAM and LCAM. When the dark zone DZ is detected (S2), an attribute of the dark zone DZ is further detected (S3). As this attribute, here, as illustrated in FIG. 15B, a length of the dark zone DZ, that is, a maximum vertical dimension (hereinafter referred to as D length) of the dark zone DZ in the captured image, is detected.

When the D length is detected as an attribute of the dark zone DZ, the lamp control unit 102 compares this D length with a reference length B length (S4). As this B length, a first reference length B1 and a second reference length B2 are set here (hereinafter referred to as B1 length and B2 length). The B2 length is set longer than the B1 length. Then, the lamp control unit 102 outputs to the headlamp HL a lamp control signal including information (hereinafter referred to as D length information) comparing the D length with the B1 and B2 lengths.

In the headlamp HL, control by the lamp drive module LDM and the leveling actuator LACT is performed based on the lamp control signal. In particular, when the lamp control signal includes the D length information, control in the lamp drive module LDM and the leveling actuator LACT is performed. That is, the light distribution pattern in the AHi lamp unit is controlled using the drive module LDM based on the D length information, or the tilting of the leveling bracket 3, that is, the directions of the illumination optical axes of the Lo lamp unit LoLU and the AHi lamp unit AHiLU is controlled using the leveling actuator LAC.

In step S4 of FIG. 17, when the D length is shorter than the B1 length, leveling control is performed by the leveling actuator LACT (S5). This leveling control reduces the forward tilting angle of the leveling bracket 3 to change the illumination optical axes of the Lo lamp unit LoLU and the AHi lamp unit AHiLU upward. In this case, no control is performed to change the AHi light distribution pattern in the AHi lamp unit AHiLU.

Figure 18A:
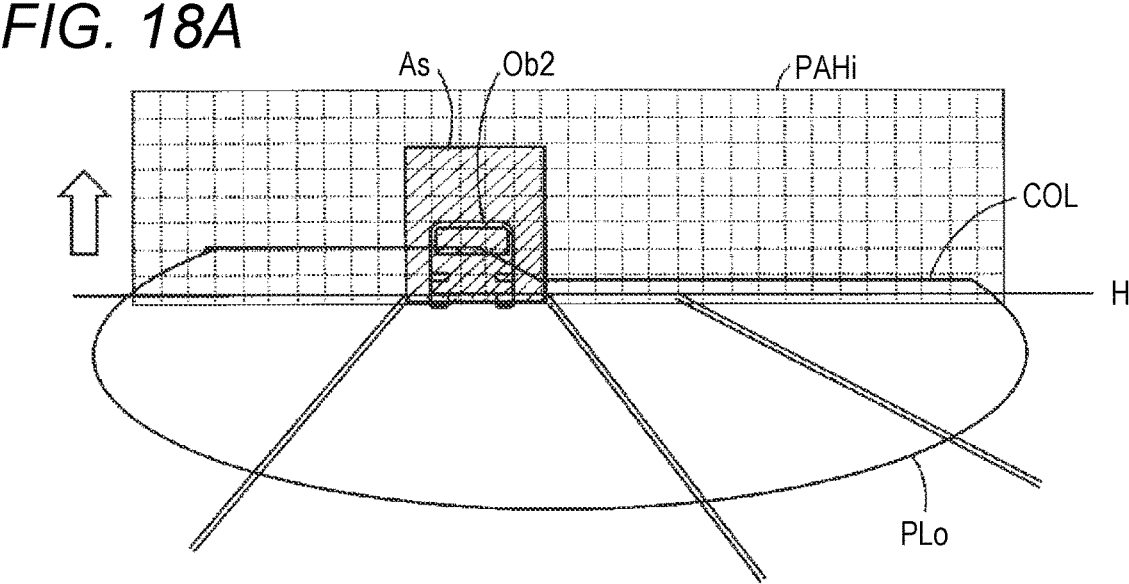
FIG. 18A is a schematic diagram of a light distribution pattern based on dark zone control when leveling control.

Therefore, as illustrated in FIG. 18A, the Lo light distribution pattern PLo and the AHI light distribution pattern PAHi are changed upward, and in particular, the cutoff line COL of the Lo light distribution pattern PLo is changed upward. As a result, the cutoff line COL is controlled to be located at a position corresponding to a lower part of the vehicle body of the preceding vehicle Ob2, and an area below this, that is, almost the entire area of the road surface between the own vehicle and the preceding vehicle Ob2, is illuminated. The dark zone DZ is eliminated to ensure good illumination with the Lo light distribution pattern PLo and the AHi light distribution pattern PAHi.

In this leveling control, the lamp control unit 102 generates a lamp control signal for leveling control based on the dark zone detected from the image captured by the lamp camera LCAM, so leveling control can be performed with high accuracy. That is, since the lamp camera LCAM can capture images at a higher frame rate than the front camera FCAM, the object detection unit 101 can detect the attribute and the attribute changes of the dark zone at high speed, and thus the lamp control unit 102 can generate a highly responsive lamp control signal to this change and perform leveling control. Although the resolution of the lamp camera LCAM is lower than that of the front camera FCAM, the changes in the preceding vehicle and the dark zone can be obtained from the movement of the high brightness portion or medium brightness portion in the captured images, so even when the resolution is low, there is no problem in detecting attribute changes.

Also, in this leveling control, only the Lo lamp unit LoLU and the AHi lamp unit AHiLU mounted on the leveling bracket 3 are tilted, and the lamp camera LCAM mounted on the aiming bracket 2 is not tilted. That is, the lamp camera LCAM and the front camera FCAM have their imaging optical axes fixed in a specified direction with respect to the automobile CAR. Since this imaging optical axis is the reference position in the image captured by the lamp camera LCAM as described above, it is not affected by the tilting of the leveling bracket 3, that is, the tilting of the Lo lamp unit LoLU and the AHi lamp unit AHiLu. Therefore, compared to the case where the imaging optical axis of the lamp camera LCAM is tilted together with the lamp unit, the processing when detecting the preceding vehicle and the dark zone is simplified, and thus faster leveling control can be realized.

Furthermore, since the lamp camera LCAM is arranged at almost the same height position as the Lo lamp unit LoLU and the AHi lamp unit AHiLU, an angle change of the imaging optical axis when the preceding vehicle is viewed from the lamp camera LCAM along with the positional change of the object is substantially the same as an angle change when the preceding vehicle is irradiated with light beams from the Lo lamp unit LoLU and the AHi lamp unit AHiLU. Therefore, the processing when detecting the amount of positional change (movement amount) of the high brightness portion and medium brightness portion detected by the lamp camera LCAM is further simplified, and thus faster leveling control can be realized.

In the leveling control, the speed of controlling the illumination optical axes of the Lo lamp unit LoLU and the AHi lamp unit AHiLU is slower than the change control of the pattern shape of the AHi light distribution pattern PAHi. However, when the D length is shorter than the B1 length, the time required for leveling control for controlling the illumination optical axis is extremely short, so influence of the slow control speed of the illumination optical axis is small, and thus in some cases it can be handled at high speed compared to the processing for change-controlling the AHi light distribution pattern PAHi.

In step S4 of FIG. 17, when the D length is longer than the B1 length and shorter than the B2 length, leveling control is not performed, and light distribution pattern control for changing the AHi light distribution pattern in the AHi lamp unit PAHi is performed (S6). The lamp drive module LDM controls the light shaded area As of the AHi light distribution pattern PAHi of the AHi lamp unit AHiLU based on the lamp control signal.

Figure 18B:
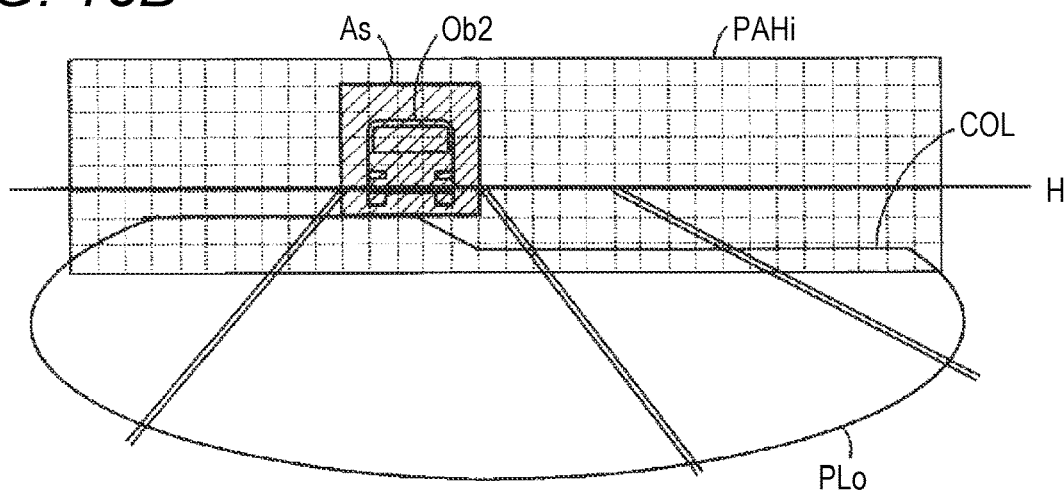
FIG. 18B is a schematic diagram of a light distribution pattern based on dark zone control when light distribution pattern control is performed.

As a result, as illustrated in FIG. 18B, although the cutoff line COL remains at a position corresponding to a position below the vehicle body of the preceding vehicle Ob2, an area below the preceding vehicle Ob2, that is, the area of the road surface between the own vehicle and the preceding vehicle Ob2, is illuminated by the AHi light distribution pattern PAHi. Therefore, the dark zone DZ is eliminated to ensure good illumination with the Lo light distribution pattern PLo and the AHi light distribution pattern PAHi.

Further, in step S4 of FIG. 17, when the D length is longer than the B2 length, the leveling control and the light distribution pattern control are performed together. That is, both the leveling control and the light distribution pattern are change-controlled at the same time (S7). For example, the dark zone DZ is conceptually divided into two areas, leveling control is performed on one area, and light distribution pattern control is performed on the other area.

Figure 18C:
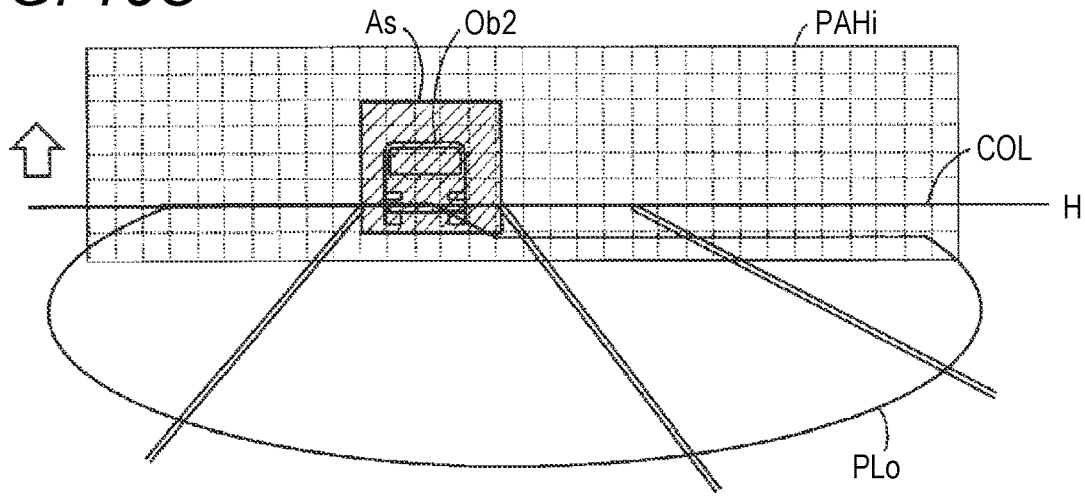
FIG. 18C is a schematic diagram of a light distribution pattern based on dark zone control when leveling control and light distribution pattern control are performed together.

As a result, as illustrated in FIG. 18C, the cutoff line COL is moved upward to a position close to a lower side of the vehicle body of the preceding vehicle Ob2, and at the same time, the area below the preceding vehicle Ob2 is illuminated by the AHi light distribution pattern PAHi. Therefore, the dark zone DZ is eliminated to ensure good illumination with the Lo light distribution pattern PLo and the AHi light distribution pattern PAHi. By controlling the leveling control and the AHi light distribution pattern integrally in this way, the total control time in the dark zone control can be suppressed, and thus the control can be performed faster.

Although the description with reference to the drawings is omitted, the change speed of the D length as an attribute of the dark zone DZ, that is, the rate of change of the D length with respect to time, may be detected, and then leveling control and AHi light distribution pattern control may be performed selectively or jointly based on this change speed. For example, only leveling control may be performed when the change speed of the D length is a relatively low value, whereas leveling control and AHi light distribution pattern control may be performed together when the change speed of the D length is a relatively high value. Alternatively, only the AHi light distribution pattern control may be performed when the change speed of the D length is an intermediate value.

During the above-described dark zone control for the preceding vehicle, when the object detection unit 101 detects an oncoming vehicle, the dark zone control may be stopped so that the dark zone control is not actually performed. This is because in the case of a preceding vehicle, a change in an inter-vehicle distance between the preceding vehicle and the own vehicle is relatively gradual, but in the case of an oncoming vehicle, a change in an inter-vehicle distance between the oncoming vehicle and the own vehicle is rapid, so there is a high possibility that the oncoming vehicle will enter an illuminated area while the dark zone control is being performed for the preceding vehicle, which may dazzle the oncoming vehicle.

Further, the above description is for the control of the preceding vehicle as the object, but the dark zone control may also be performed for the dark zone generated for the oncoming vehicle. Alternatively, when dark zones are generated for other objects as well, dark zone control may be performed in the same manner.

Although the above-described embodiment has a configuration including the Lo lamp unit LoLU and the AHi lamp unit AHiLU, it may be configured with only the AHi lamp unit. For example, as the configuration of the AHi lamp unit AHiLU illustrated in FIG. 6, a configuration in which a plurality of, for example, two multi-segmented LED arrays 61 are disposed vertically as indicated by the chain line may be employed. In this case, for example, the projection lens 62 is preferably configured as a compound lens having two focal points above and below so that AHi light distribution patterns PAHi formed by the respective multi-segmented LED arrays 61 are projected in contact with the upper and lower sides. By providing these two multi-segmented LED arrays 61, a composite AHi light distribution pattern PAHic is formed by combining the two vertically arranged AHi light distribution patterns PAHi, as illustrated in FIG. 9. In this case, only the AHi lamp unit AHiLU is mounted on the leveling bracket 3, and leveling control is performed by the leveling actuator LACT.

In illumination with such a composite AHi light distribution pattern PAHic, a low-beam light distribution pattern with a cutoff line is formed by selectively controlling the light emission of individual pixel elements. Then, when a dark zone occurs, control is performed to eliminate the dark zone in the same manner as in the above-described embodiment. That is, either one of the control of the light distribution pattern in the composite AHi light distribution pattern PAHic and the leveling control of the AHi lamp unit AHiLU, or both controls are performed together. For example, control may be performed with a light distribution pattern that eliminates part of the dark zone, and the lack thereof may be compensated for by leveling control. Alternatively, dark zone control may be performed by leveling control, and the lack thereof may be compensated for by light distribution pattern control.

Even in this case, dark zone control may be performed by appropriately combining light distribution pattern control and leveling control based on the detected attribute of the dark zone, that is, the D length or the change speed of the D length, in the same manner as in the above-described embodiment.

Further, although illustration is omitted, instead of the Lo lamp unit and the AHi lamp unit, a lamp unit that selectively reflects light beams from a light source with a digital micromirror device (DMD) to control light distribution may be used. Alternatively, it may be configured by a scan type lamp unit that scans light beams. Even when it is configured with these units, it is sufficient to mount only these units on the leveling bracket and perform leveling control.

In the embodiment, two cameras are provided: a front camera with a high frame rate and low resolution that can be configured at low cost, and a lamp camera with a low frame rate and high resolution that can be configured at low cost. This is because cameras with fast frame rates and high resolution are very expensive. When a camera with a high frame rate and a high resolution can be obtained at a low cost, it may be configured with only one lamp camera. Alternatively, in the present invention, the lamp camera may be directly connected to the lamp drive module, in which case the lamp camera may be configured with a camera with a frame rate similar to that of the front camera. Even when the frame rate is low, substantially high-speed control is possible by processing the imaging signal obtained by imaging with the lamp camera with the lamp drive module and performing lamp light distribution control.

Also, in the embodiment, the aiming bracket is used for aiming adjustment, but it may be applied to a headlamp configured to adjust the aiming of the entire lamp housing containing the lamp unit and the lamp camera with respect to a vehicle body of the automobile. In this case, the aiming bracket is omitted, the lamp camera is supported by the lamp housing, and the lamp unit is mounted on a leveling bracket that tilts with respect to the lamp housing.

Further, although in the embodiment, the vehicle ECU has an object detection unit, a lamp control unit, and a camera control unit, the headlamp may be provided with a lamp ECU, and the lamp ECU may be provided with an object detection unit, a lamp control unit, and a camera control unit. Alternatively, some of these may be provided. In this case, it is preferable that the lamp ECU be connected to the vehicle ECU and each signal is transmitted and received between the lamp ECU and the vehicle ECU.

This application is based on a Japanese patent application (Japanese Patent Application No. 2020-173635) filed on Oct. 15, 2020, and a Japanese patent application (Japanese Patent Application 2020-179293, Japanese Patent Application 2020-179294) filed on Oct. 27, 2020, the contents of which are incorporated herein by reference.

INDUSTRIAL APPLICABILITY

According to the present invention, it is possible to provide a vehicle lamp that enables high-speed leveling control or ADB control, and a control device that controls light distribution thereof. Further, according to the present invention, it is possible to provide a vehicle lamp control device that suppresses influence of light leakage in a lamp camera in a vehicle lamp including a lamp camera and a lamp unit and makes it possible to detect an object, for example, in light distribution control, with high accuracy. Further, according to the present invention, it is possible to provide a vehicle lamp control method and a control device that enable suitable light distribution control that eliminates a dark zone.

REFERENCE SIGNS LIST

HL (L-HL, R-HL): headlamp
LoLU: Lo lamp unit (low beam lamp unit)
AHiLU: AHi lamp unit (ADB high beam lamp unit)
TSLU: TS lamp unit (turn signal lamp unit)
DRLU: DR lamp unit (daytime running lamp unit)
FCAM: front camera
LCAM: lamp camera
LACT: leveling actuator
LDM: lamp drive module
Ob: object
Ob1: preceding vehicle
Ob2: oncoming vehicle
As: light shaded area
COL: cutoff line
DZ: dark zone
PLo: Lo light distribution pattern
PAHi: AHi light distribution pattern
Aa, Al: illumination optical axis
Ac: imaging optical axis
1: lamp housing
2: aiming bracket (first member)
3: leveling bracket (second member)
11: lamp body
12: translucent cover
aiming mechanism
leveling mechanism
91: light shielding hood
92: light shielding sleeve
100: vehicle ECU (control means)
101: object detection unit
102: lamp control unit
103: camera control unit
104: TS timing portion
105: shutter timing portion
106: exposure amount control portion

The invention claimed is:

1. A vehicle lamp control device comprising:
a vehicle lamp mounted on a vehicle where a lamp housing is equipped with a lamp camera that captures an image of an object existing outside the vehicle and a lamp unit of which light distribution of emitted light beams is controlled to change based on positional information of the object captured by the lamp camera,
a control unit that controls the light distribution and an illumination optical axis of the lamp unit; and
a front camera that captures an image of an object existing outside the vehicle with a higher resolution than the lamp camera, wherein
the control unit includes an object detection unit that detects an object from the image captured by the lamp camera, and a lamp control unit that controls the light distribution of the lamp unit based on the positional information of the detected object, and controls a change of the illumination optical axis in an up-down direction of the lamp unit based on a positional change of the object, and
the lamp control unit of the control unit controls the lamp unit based on positional information of the object captured by the front camera and the lamp camera.

2. The vehicle lamp control device according to claim 1, wherein
the lamp camera is capable of imaging at a frame rate higher than that of the front camera, and
the lamp control unit controls the illumination optical axis based on a positional change of the object imaged by the lamp camera.

3. A vehicle lamp control device comprising:
a vehicle lamp mounted on a vehicle where a lamp housing is equipped with a lamp camera that captures an image of an object existing outside the vehicle and a lamp unit of which light distribution of emitted light beams is controlled to change based on positional information of the object captured by the lamp camera; and
a control unit that controls the light distribution and an illumination optical axis of the lamp unit, wherein
the lamp camera is fixedly supported by an aiming bracket,
the lamp unit is supported by a leveling bracket tiltable in a front-rear direction of the vehicle with respect to the aiming bracket, and
the lamp control unit controls a leveling actuator that tilts the leveling bracket based on the positional change of the object.

4. A vehicle lamp control device comprising:
in a vehicle lamp including a lamp unit and a lamp camera,
a lamp control unit that controls lighting of the lamp unit;
an object detection unit that detects an object based on an imaging signal captured by the lamp camera; and
a camera control unit that controls an imaging operation of the lamp camera,
wherein the camera control unit performs hindrance suppression control for suppressing hindrance in object detection by the object detection unit due to leakage of a light beam from the lamp unit to the lamp camera.

5. The vehicle lamp control device according to claim 4, wherein
the lamp control unit periodically blinks the lamp unit, and
the camera control unit performs the hindrance suppression control at a timing when the lamp unit is turned on.

6. The vehicle lamp control device according to claim 5, wherein the hindrance suppression control of the camera control unit is control for stopping imaging of the lamp camera.

7. The vehicle lamp control device according to claim 6, further comprising a second camera arranged at a position away from the lamp camera or the lamp unit,
wherein the hindrance suppression control of the camera control unit is control for outputting an imaging signal of the second camera to the object detection unit when the lamp unit is turned on.

8. The vehicle lamp control device according to claim 5, wherein the hindrance suppression control of the camera control unit is control to block the imaging signal captured by the lamp camera so as not to be output to the object detection unit.

9. The vehicle lamp control device according to claim 5, wherein the hindrance suppression control of the camera control unit is control for reducing a signal level of the imaging signal captured by the lamp camera.

10. The vehicle lamp control device according to claim 4, wherein the hindrance suppression control of the camera control unit is control for removing a frequency component of a color light beam emitted from the lamp unit among frequency components of the imaging signal captured by the lamp camera.

11. The vehicle lamp control device according to claim 4, wherein
the lamp control unit outputs a lamp control signal for controlling lighting of the lamp unit, and
the camera control unit performs hindrance suppression control of the lamp camera based on the lamp control signal.

12. The vehicle lamp control device according to claim 11, further comprising an illumination lamp unit separate from a sign lamp unit, the sign lamp unit being the lamp unit,
wherein the lamp control unit controls at least one of a light distribution pattern and an illumination optical axis direction of the illumination lamp unit based on a positional information of the object detected by the object detection unit.

13. The vehicle lamp control device according to claim 12, wherein the lamp camera includes a light shielding hood for preventing leakage of light beams from the sign lamp unit and the illumination lamp unit.

14. A vehicle lamp control device comprising:
a vehicle lamp including a lamp unit that is capable of changing a light distribution pattern of emitted light beams and an illumination optical axis; and
a control unit that detects an object from an image captured by a camera and controls the lamp unit based on positional information of the detected object, wherein
the control unit includes an object detection unit that detects the object and detects a dark zone that occurs when the lamp unit irradiates the detected object with a light beam, and a lamp control unit for selectively or jointly controlling the light distribution pattern and the illumination optical axis of the lamp unit based on the detected dark zone,
the vehicle lamp includes a leveling device that changes the illumination optical axis of the lamp unit in an up-down direction,
the lamp control unit controls the leveling device,
the lamp unit includes a first lamp unit that irradiates an area below a predetermined cutoff line with a light beam, and a second lamp unit that irradiates an area above the cutoff line with a light beam,
the lamp control unit controls illumination optical axes of the first and second lamp units in the up-down direction by the leveling device, and controls a light distribution pattern of the second lamp unit,
the second lamp unit is capable of performing light distribution control in which light irradiation to an area where the object exists is stopped and light irradiation to other areas is executed, wherein
the first lamp unit is a low beam lamp unit,
the second lamp unit is an ADB high-beam lamp unit that uses a micro LED light emitting element as a light source, and
the light distribution pattern is controlled by selectively causing the micro LED light emitting element to emit a light beam.

* * * * *